United States Patent
Ishizaki et al.

(10) Patent No.: US 12,449,921 B2
(45) Date of Patent: *Oct. 21, 2025

(54) DISPLAY DEVICE WITH TOUCH DETECTION FUNCTION AND ELECTRONIC APPARATUS

(71) Applicant: Magnolia White Corporation, Tokyo (JP)

(72) Inventors: Koji Ishizaki, Tokyo (JP); Hayato Kurasawa, Tokyo (JP); Kohei Azumi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/817,791

(22) Filed: Aug. 28, 2024

(65) Prior Publication Data
US 2024/0419273 A1  Dec. 19, 2024

Related U.S. Application Data

(63) Continuation of application No. 18/516,394, filed on Nov. 21, 2023, now Pat. No. 12,111,993, which is a
(Continued)

(30) Foreign Application Priority Data

Nov. 30, 2012  (JP) ................. 2012-263803

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G02F 1/133512* (2013.01);
(Continued)

(58) Field of Classification Search
CPC .. G06F 3/0412; G06F 3/04166; G06F 3/0445; G06F 3/0446; G06F 2203/04108;
(Continued)

(56) References Cited

U.S. PATENT DOCUMENTS

2008/0129898 A1  6/2008  Moon
2010/0214262 A1  8/2010  Ishizaki et al.
(Continued)

FOREIGN PATENT DOCUMENTS

CN  101211081 A  7/2008
CN  101814256 A  8/2010
(Continued)

OTHER PUBLICATIONS

Office Action issued in related Chinese Patent Application No. 2022102789007, mailed on Aug. 30, 2024 and English translation of same. 12 pages.
(Continued)

*Primary Examiner* — Jonathan A Boyd
(74) *Attorney, Agent, or Firm* — K&L Gates LLP

(57) ABSTRACT

According to an aspect, a display device with a touch detection function includes: a substrate; a drive electrode that extends in a first direction; and a plurality of touch detection electrodes that are metal wirings extending in a second direction different from the first direction. The metal wirings are arranged with a predetermined pitch so as to make capacitive coupling with the drive electrode.

7 Claims, 26 Drawing Sheets

Related U.S. Application Data continuation of application No. 17/736,275, filed on May 4, 2022, now Pat. No. 11,914,808, which is a continuation of application No. 17/208,341, filed on Mar. 22, 2021, now Pat. No. 11,327,591, which is a continuation of application No. 16/826,407, filed on Mar. 23, 2020, now Pat. No. 10,996,784, which is a continuation of application No. 16/421,106, filed on May 23, 2019, now Pat. No. 10,613,698, which is a continuation of application No. 16/058,565, filed on Aug. 8, 2018, now Pat. No. 10,303,320, which is a continuation of application No. 15/452,980, filed on Mar. 8, 2017, now Pat. No. 10,067,624, which is a continuation of application No. 15/064,909, filed on Mar. 9, 2016, now Pat. No. 9,626,060, which is a continuation of application No. 14/082,826, filed on Nov. 18, 2013, now Pat. No. 9,304,639.

(51) Int. Cl.
  *G02F 1/1335* (2006.01)
  *G02F 1/1343* (2006.01)
  *G06F 3/044* (2006.01)

(52) U.S. Cl.
  CPC .. *G02F 1/133514* (2013.01); *G02F 1/134336* (2013.01); *G06F 3/04166* (2019.05); *G06F 3/0445* (2019.05); *G06F 3/0446* (2019.05); *G02F 2201/123* (2013.01); *G02F 2201/52* (2013.01); *G06F 2203/04107* (2013.01); *G06F 2203/04108* (2013.01); *G06F 2203/04111* (2013.01); *G06F 2203/04112* (2013.01)

(58) Field of Classification Search
  CPC . G06F 2203/04111; G06F 2203/04107; G06F 2203/04112; G02F 1/13338; G02F 1/133512; G02F 1/133514; G02F 1/134336; G02F 2201/123; G02F 2201/52
  See application file for complete search history.

(56) References Cited

U.S. PATENT DOCUMENTS

| | | |
|---|---|---|
| 2011/0156995 A1 | 6/2011 | Choi |
| 2012/0062511 A1 | 3/2012 | Ishizaki et al. |
| 2012/0105337 A1 | 5/2012 | Jun et al. |
| 2012/0113027 A1 | 5/2012 | Song et al. |
| 2012/0162096 A1 | 6/2012 | Lin et al. |
| 2012/0249444 A1 | 10/2012 | Lee et al. |
| 2013/0021321 A1 | 1/2013 | Kang |
| 2013/0063371 A1 | 3/2013 | Lee et al. |
| 2013/0147730 A1 | 6/2013 | Chien et al. |
| 2014/0293154 A1 | 10/2014 | Philipp |

FOREIGN PATENT DOCUMENTS

| | | |
|---|---|---|
| CN | 102053751 A | 5/2011 |
| CN | 102081479 A | 6/2011 |
| CN | 102402356 A | 4/2012 |
| CN | 102466907 A | 5/2012 |
| CN | 102541355 A | 7/2012 |
| CN | 102725714 A | 10/2012 |
| CN | 102736291 A | 10/2012 |
| JP | 2010-197576 A | 9/2010 |
| JP | 2011-138154 A | 7/2011 |
| JP | 2012-198740 A | 10/2012 |
| KR | 10-2012-0045288 A | 5/2012 |
| TW | 201217863 A | 5/2012 |

OTHER PUBLICATIONS

Korean Office Action issued Jun. 30, 2015 in corresponding Korean Application No. 10-2013-0145035.
Notice of Rejection issued in connection with Japanese Patent Application No. 2012-263803, dated Mar. 31, 2015. (6 pages).
Taiwan Office Action for corresponding patent application No. 102140318 mailed on Jan. 26, 2015.
Chinese Office Action issued Apr. 5, 2016 in corresponding Chinese Application No. 2013106011096.
Chinese Office Action issued Nov. 25, 2013 in corresponding Chinese Application No. 2013106011096.
Chinese Office Action issued Jan. 27, 2021 in corresponding Chinese Application No. 201811099003.X.
Chinese Office Action issued Jul. 6, 2021 in corresponding Chinese Application No. 201811099003.X.
Chinese Office Action issued Aug. 19, 2023 in corresponding Chinese Application No. 202210278900.7.
Chinese Office Action issued May 10, 2024 in corresponding Chinese Application No. 202210278900.7.
Office Action issued in related Chinese patent application No. 202110644990.2, mailed on Feb. 18, 2025 and English translation of same. 14 pages.

543 DISPLAY UNIT
542 KEYBOARD
541 MAIN BODY

551 UPPER CASING
554 DISPLAY
552 LOWER CASING

551 UPPER CASING
552 LOWER CASING

DISPLAY DEVICE WITH TOUCH DETECTION FUNCTION AND ELECTRONIC APPARATUS

CROSS-REFERENCE TO RELATED APPLICATIONS

The present application is a continuation of U.S. patent application Ser. No. 18/516,394, filed on Nov. 21, 2023, which application is a continuation of U.S. patent application No. Ser. No. 17/736,275, filed on May 4, 2022, issued as U.S. Pat. No. 11,914,808 on Feb. 27, 2024, which application is a continuation of U.S. patent application Ser. No. 17/208,341, filed on Mar. 22, 2021, issued as U.S. Pat. No. 11,327,591 on May 10, 2022, which application is a continuation of U.S. patent application Ser. No. 16/826,407, filed on Mar. 23, 2020, issued as U.S. Pat. No. 10,996,784 on May 4, 2021, which application is a continuation of U.S. patent application Ser. No. 16/421,106, filed on May 23, 2019, issued as U.S. Pat. No. 10,613,698 on Apr. 7, 2020, which application is a continuation of U.S. application Ser. No. 16/058,565, filed on Aug. 8, 2018, issued as U.S. Pat. No. 10,303,320 on May 28, 2019, which application is a continuation of U.S. patent application Ser. No. 15/452,980, filed on Mar. 8, 2017, issued as U.S. Pat. No. 10,067,624 on Sep. 4, 2018, which application is a continuation of U.S. patent application Ser. No. 15/064,909, filed on Mar. 9, 2016, issued as U.S. Pat. No. 9,626,060 on Apr. 18, 2017, which application is a continuation of U.S. patent application Ser. No. 14/082,826, filed on Nov. 18, 2013, issued as U.S. Pat. No. 9,304,639 on Apr. 5, 2016, which application claims priority from Japanese Application No. 2012-263803, filed on Nov. 30, 2012, the contents of which are incorporated by reference herein in its entirety.

BACKGROUND

1. Technical Field

The present disclosure relates to a display device and an electronic apparatus capable of detecting an external proximity object, and more particularly, to a display device with a touch detection function and an electronic apparatus capable of detecting an external proximity object based on a change in electrostatic capacitance.

2. Description of the Related Art

In recent years, attention has been paid to touch detection devices referred to as so-called touch panels capable of detecting external proximity objects. The touch panels are mounted on or integrated with a display device such as a liquid crystal display device and are used for display devices with a touch detection function. The display devices with a touch detection function display various button images on the display device, thereby enabling input of information with the touch panel as a substitute for ordinary mechanical buttons. The display devices with a touch detection function, which include such touch panels, do not require input devices such as a keyboard, a mouse, and a keypad, and the use of the display devices tends to increase in portable information devices such as cellular phones as well as in computers.

Types of a touch detection method include several types such as an optical type, a resistive type, and a capacitance type. When touch detection devices of the capacitance type are used in mobile devices and the like, devices having relatively simple structures and low power consumption can be provided. For example, in Japanese Patent Application Laid-open Publication No. 2010-197576, a touch panel is disclosed in which a transparent electrode pattern is configured to be invisible.

Now, the display devices with a touch detection function are going to be formed to be thin, have a large screen, or have high precision, and accordingly, low resistance of touch detection electrodes is required. For the touch detection electrodes, as the material of transparent electrodes, a transparent conductive oxide such as indium tin oxide (ITO) is used. In order to configure the touch detection electrodes to have low resistance, a metal material may be effectively used. However, since the metal material has a light shielding property higher than that of a transparent conductive oxide such as ITO, there is a possibility that the transmittance may decrease, or the pattern of the touch detection electrodes may be visually recognized.

For the foregoing reasons, there is a need for a display device with a touch detection function and an electronic apparatus capable of detecting a touch while suppressing the electrical resistance and the visual recognition of patterns even in a case where metal touch detection electrodes are used.

SUMMARY

According to an aspect, a display device with a touch detection function includes: a substrate; a plurality of pixel electrodes that are arranged in a matrix on a plane parallel to a surface of the substrate; a plurality of signal lines that extend on a plane parallel to the surface of the substrate and supply pixel signals used for displaying an image to the pixel electrodes; a display functional layer that performs an image displaying function based on the pixel signals; a drive electrode that faces the plurality of the pixel electrodes in a vertical direction with respect to the surface of the substrate and extends in a direction parallel to an extending direction of the signal lines; and a plurality of touch detection electrodes that are metal wirings facing the drive electrode in the vertical direction and extending in a direction different from the extending direction of the signal lines. The metal wirings are arranged with a predetermined pitch so as to make capacitive coupling with the drive electrode.

According to another aspect, a display device with a touch detection function includes: a substrate; a plurality of pixel electrodes that are arranged in a matrix on a plane parallel to a surface of the substrate; a plurality of signal lines that extend on a plane parallel to the surface of the substrate and supply pixel signals to the pixel electrodes; a display functional layer that performs an image displaying function based on the pixel signals; a drive electrode that faces the plurality of the pixel electrodes in a vertical direction with respect to the surface of the substrate and extends in a direction different from an extending direction of the signal lines; a plurality of touch detection electrodes that are metal wirings facing the drive electrode in the vertical direction; and a color filter that faces the display functional layer in the vertical direction and has a plurality of color areas including at least one of a color area colored in red, a color area colored in green, and a color area colored in blue. The metal wirings are arranged with a predetermined pitch so as to make capacitive coupling with the drive electrode. The plurality of touch detection electrodes cross over each color area of the color filter while extending in an extending direction of the signal lines.

According to another aspect, a display device with a touch detection function includes: a substrate; a plurality of pixel electrodes that are arranged in a matrix on a plane parallel to a surface of the substrate; a plurality of signal lines that extend on a plane parallel to the surface of the substrate and supply pixel signals to the pixel electrodes; a display functional layer that performs an image displaying function based on the pixel signals; a drive electrode that faces the plurality of the pixel electrodes in a vertical direction with respect to the surface of the substrate and extends in a direction different from an extending direction of the signal lines; a plurality of touch detection electrodes that face the drive electrode in the vertical direction and are arranged with a predetermined pitch so as to make capacitive coupling with the drive electrode; and a color filter that faces the display functional layer in the vertical direction and has a plurality of color areas including at least one of a color area colored in red, a color area colored in green, and a color area colored in blue. The touch detection electrodes include a transparent electrode and a metal electrode. The transparent electrode extends along a specific one of the color areas of the color filter. The metal electrode is divided in the extending direction and is stacked on the transparent electrode.

According to another aspect, an electronic apparatus o includes any one of the above-described display devices with a touch detection function.

DETAILED DESCRIPTION

Modes for carrying out the present disclosure (embodiments) will be described in detail with reference to the drawings. However, the present disclosure is not limited to the contents described in the following embodiments. Each constituent element described below includes elements that can be easily conceived by those skilled in the art, elements that are substantially identical thereto. Further, the constituent elements described below may be appropriately combined. The description will be presented in the following order.

1. Embodiments (Display Devices with Touch Detection Function)
    1-1. First Embodiment
    1-2. Second Embodiment
    1-3. Third Embodiment
    1-4. Fourth Embodiment
    1-5. Other Embodiments and Modifications
2. Application Examples (Electronic Apparatuses)
    Examples of Applications of Display devices with Touch Detection Function According to Above Embodiment for Electric Apparatuses
3. Aspects of Present Disclosure

1. EMBODIMENTS 1-1. First Embodiment 1-1A. Configuration Example

Example of Whole Configuration

Figure 1:
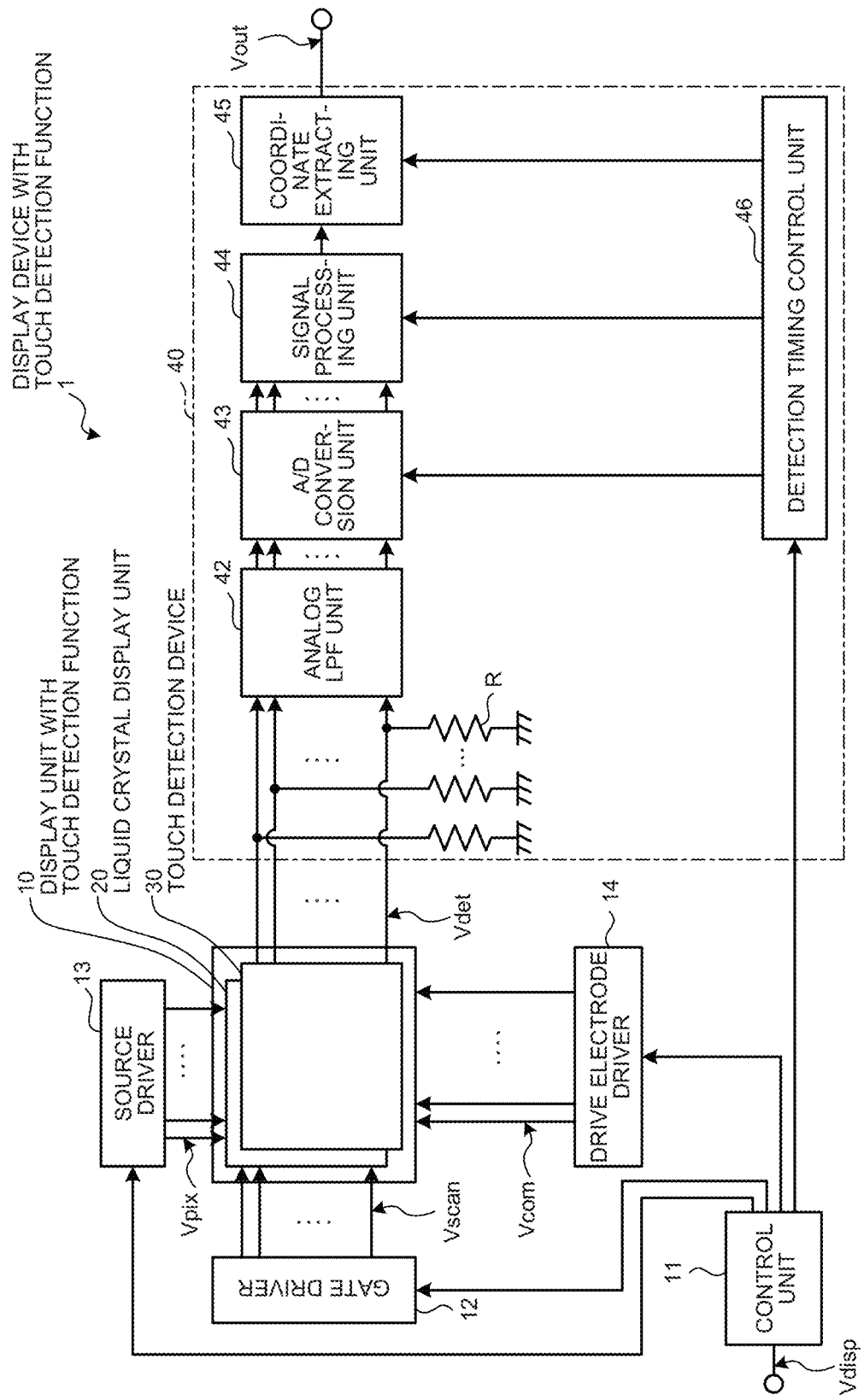
FIG. 1 is a block diagram that illustrates an example of the configuration of a display device with a touch detection function according to a first embodiment.

FIG. 1 is a block diagram that illustrates an example of the configuration of a display device with a touch detection function according to a first embodiment. A display device 1 with a touch detection function includes: a display unit 10 with a touch detection function; a control unit 11; a gate driver 12; a source driver 13; a drive electrode driver 14; and a touch detection unit 40. This display device 1 with a touch detection function is a display device in which the display unit 10 with a touch detection function has a touch detection function built therein. The display unit 10 with a touch detection function is a so-called in-cell type device acquired by integrating a liquid crystal display unit 20 using a liquid crystal display element as a display element and a touch detection device 30 of the capacitance type. The display unit 10 with a touch detection function may be a so-called on-cell type device acquired by mounting the touch detection device 30 of the capacitance type on the liquid crystal display unit 20 using a liquid crystal display element as a display element.

The liquid crystal display unit 20 performs a display by sequentially scanning each one horizontal line in accordance with a scanning signal Vscan supplied from the gate driver 12, as will be described later. The control unit 11 supplies control signals to the gate driver 12, the source driver 13, the drive electrode driver 14, and the touch detection unit 40 based on a video signal Vdisp supplied from the outside and controls them so as to operate in a synchronized manner.

The gate driver 12 has a function for sequentially selecting one horizontal line that is a target of display driving for the display unit 10 with a touch detection function based on a control signal supplied from the control unit 11.

The source driver 13 is a circuit that supplies a pixel signal Vpix to each pixel Pix, which will be described later, of the display unit 10 with a touch detection function based on a control signal supplied from the control unit 11.

The drive electrode driver 14 is a circuit that supplies a drive signal Vcom to drive electrodes COML, which will be described later, of the display unit 10 with a touch detection function based on a control signal supplied from the control unit 11.

Basic Principle of Touch Detection of Capacitance Type

Figure 2:
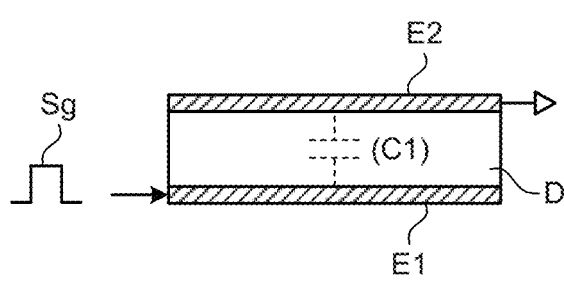
FIG. 2 is an explanatory diagram that illustrates a state in which a finger is not in contact with or in proximity to a device for illustrating a basic principle of a touch detection method of a capacitance type.
Figure 3:
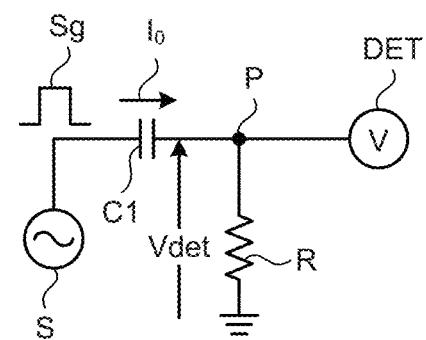
FIG. 3 is an explanatory diagram that illustrates an example of an equivalent circuit in a state in which a finger is not in contact with or in proximity to a device as illustrated in FIG. 2.
Figure 4:
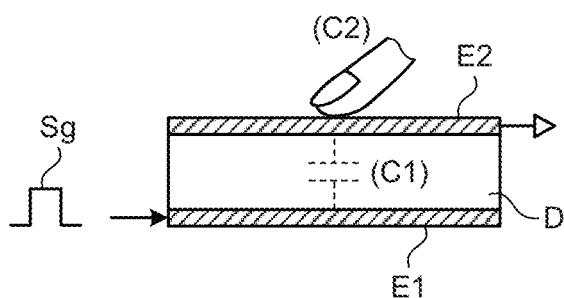
FIG. 4 is an explanatory diagram that illustrates a state in which a finger is in contact with or in proximity to a device for illustrating a basic principle of the touch detection method of the capacitance type.
Figure 5:
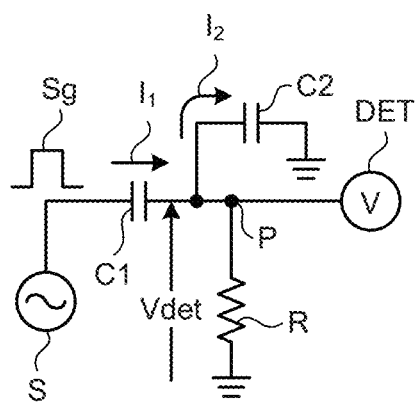
FIG. 5 is an explanatory diagram that illustrates an example of an equivalent circuit in a state in which a finger is in contact with or in proximity to a device as illustrated in FIG. 4.
Figure 6:
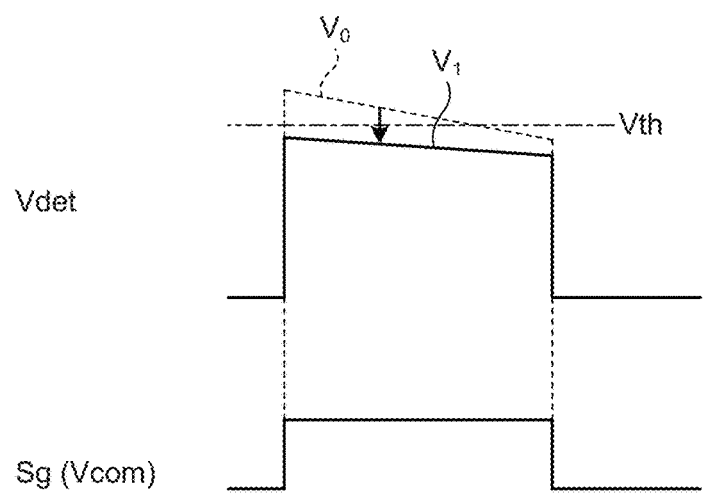
FIG. 6 is a diagram that illustrates an example of waveforms of a drive signal and a touch detection signal.

The touch detection device 30 outputs a touch detection signal Vdet by operating based on the basic principle of touch detection of the capacitance type. The basic principle of touch detection in the display device with a touch detection function according to the embodiment will be described with reference to FIGS. 1 to 6. FIG. 2 is an explanatory diagram that illustrates a state in which a finger is not in contact with or in proximity to a device for illustrating the basic principle of a touch detection method of the capacitance type. FIG. 3 is an explanatory diagram that illustrates an example of an equivalent circuit in a state in which a finger is not in contact with or in proximity to a device as illustrated in FIG. 2. FIG. 4 is an explanatory diagram that illustrates a state in which a finger is in contact with or in proximity to a device for illustrating the basic principle of the touch detection method of the capacitance type. FIG. 5 is an explanatory diagram that illustrates an example of an equivalent circuit in the state in which a finger is in contact with or in proximity to a device as illustrated in FIG. 4.

For example, as illustrated in FIGS. 2 and 4, a capacitor element C1 includes: a pair of electrodes, which are arranged so as to face each other with a dielectric D interposed therebetween; a drive electrode E1; and a touch detection electrode E2. As illustrated in FIGS. 3 and 5, the capacitor element C1 has one end being connected to an AC signal source (drive signal source) S and the other end P being grounded through a resistor R and connected to a voltage detector (touch detection unit) DET.

When an AC rectangular wave Sg of a predetermined frequency (for example, about several kHz to several hundreds of kHz) is applied to the drive electrode E1 (one end of the capacitor element C1) from the AC signal source S, an output waveform (touch detection signal Vdet) appears at the touch detection electrode E2 (the other end P of the capacitor element C1). This AC rectangular wave Sg corresponds to a touch drive signal Vcomt to be described later.

In a state (non-contact state) where a finger is not in contact with (or in proximity to) a device, as illustrated in FIGS. 2 and 3, a current $I_0$ according to a capacitance value of the capacitor element C1 flows in accordance with charging and discharging of the capacitor element C1. The waveform of the electric potential at the other end P of the capacitor element C1 at this time, for example, is a waveform $V_0$ illustrated in FIG. 6, and the voltage detector DET illustrated in FIG. 3 detects the waveform $V_0$.

On the other hand, in a state (contact state) where a finger is in contact with (or in proximity to) a device, as illustrated in FIG. 4, electrostatic capacitance formed by the finger acts as a capacitor element C2 so as to be added to the capacitor element C1. When the equivalent circuit illustrated in FIG. 5 is considered, the capacitor element C2 is formed to be added in series with the capacitor element C1. In this state, currents $I_1$ and $I_2$ flow through the capacitor elements C1 and C2 in accordance with charging and discharging of the capacitor elements C1 and C2, respectively. The waveform of the electric potential at the other end P of the capacitor element C1 at this time, for example, is a waveform $V_1$ illustrated in FIG. 6, and the voltage detector DET detects the waveform $V_1$. At this time, the electric potential at the other end P is voltage-divided electric potential that is determined based on values of the currents $I_1$ and $I_2$ flowing through the capacitor elements C1 and C2. Accordingly, the waveform $V_1$ has a value smaller than that of the waveform $V_0$ that is in the non-contact state. The voltage detector DET compares a detected voltage with a predetermined threshold voltage Vth. When the detected voltage is the threshold voltage or more, the voltage detector DET determines a non-contact state. On the other hand, when the detected voltage is less than the threshold voltage Vth, the voltage detector DET determines a contact state. Thus, touch detection can be made.

The touch detection device 30 illustrated in FIG. 1 performs touch detection by sequentially scanning each one detection block in accordance with a drive signal Vcom (the touch drive signal Vcomt to be described later) supplied from the drive electrode driver 14.

The touch detection device 30 outputs a touch detection signal Vdet from a plurality of touch detection electrodes TDL to be described later for each detection block, and thereby supplying the touch detection signal to the touch detection unit 40.

The touch detection unit 40 is a circuit that detects whether there is a touch (the above-described contact state) on the touch detection device 30 based on the control signal supplied from the control unit 11 and the touch detection signal Vdet supplied from the touch detection device 30 of the display unit 10 with a touch detection function. When detecting that there is a touch, the touch detection unit 40 acquires the coordinates thereof or the like in a touch detection area. This touch detection unit 40 includes an analog low pass filter (LPF) unit 42, an A/D conversion unit 43, a signal processing unit 44, a coordinate extracting unit 45, and a detection timing control unit 46.

The analog LPF unit 42 is a low pass filter that receives the touch detection signal Vdet supplied from the touch detection device 30 as an input, eliminates a high frequency component (noise component) included in the touch detection signal Vdet, extracts a touch component, and outputs the touch component. Between each input terminal of the analog LPF unit 42 and the ground, a resistor R used for providing DC electric potential (0 V) is connected. Instead of this resistor R, for example, a switch may be arranged and be configured to provide DC electric potential (0 V) by being turned on at predetermined time.

The A/D conversion unit 43 is a circuit that samples an analog signal output from the analog LPF unit 42 at timing synchronized with the drive signal Vcom to convert the analog signal into a digital signal.

The signal processing unit 44 includes a digital filter that eliminates a frequency component (noise component) higher than the sampling frequency of the touch drive signal Vcomt, which is included in the output signal of the A/D conversion unit 43, and extracts a touch component. The signal processing unit 44 is a logic circuit that detects a presence or no presence of a touch on the touch detection device 30 based on the output signal of the A/D conversion unit 43.

The coordinate extracting unit 45 is a logic circuit that acquires touch panel coordinates of a touch when the touch is detected by the signal processing unit 44. The detection timing control unit 46 performs control such that the A/D conversion unit 43, the signal processing unit 44, and the coordinate extracting unit 45 operate to be synchronized with each other.

Module

Figure 7:
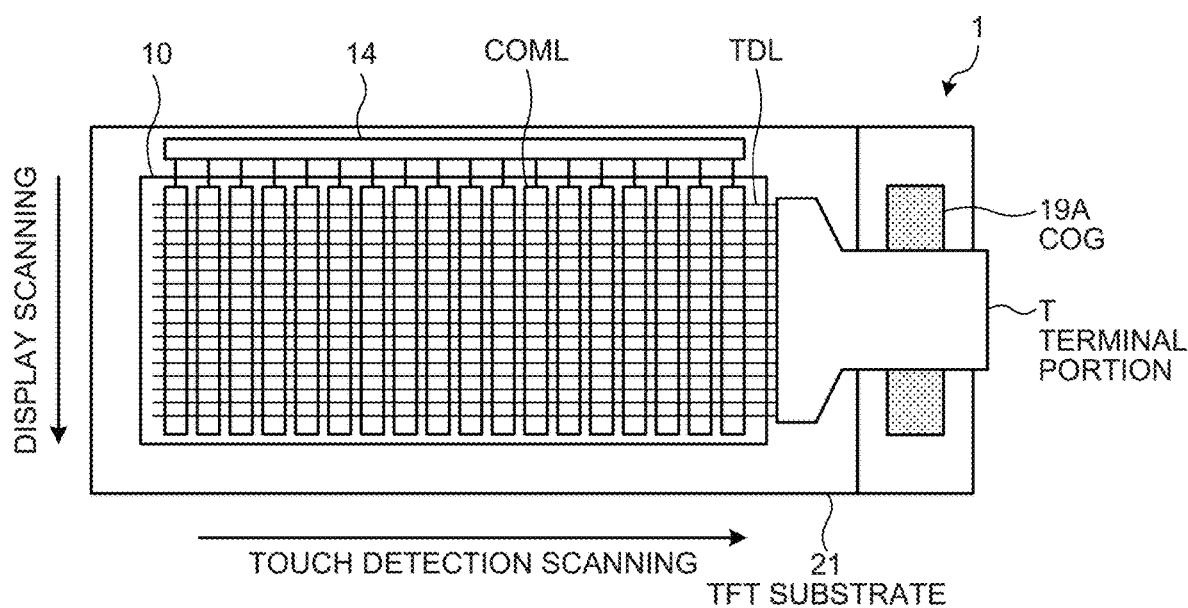
FIG. 7 is a diagram that illustrates an example of a module in which a display device with a touch detection function is mounted.
Figure 8:
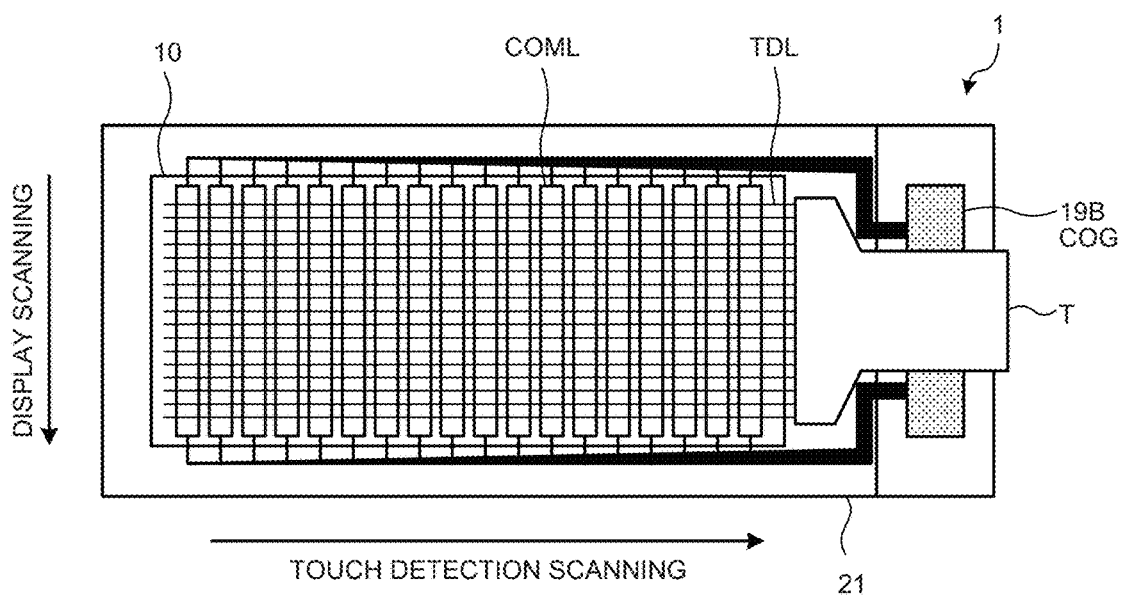
FIG. 8 is a diagram that illustrates an example of a module in which a display device with a touch detection function is mounted.

FIGS. 7 and 8 are diagrams that illustrate examples of a module in which a display device with a touch detection function is mounted. As illustrated in FIG. 7, when the display device 1 with a touch detection function is mounted in the module, the above-described drive electrode driver 14 may be formed on a TFT substrate 21 of a glass substrate.

As illustrated in FIG. 7, the display device 1 with a touch detection function includes: the display unit 10 with a touch detection function; the drive electrode driver 14; and a chip on glass (COG) 19A. The display unit 10 with a touch detection function is a so-called landscape type (horizontally long). This display unit 10 with a touch detection function schematically illustrates drive electrodes COML and touch detection electrodes TDL formed to make an overhead crossing over the drive electrode COML in a direction perpendicular to the surface of the TFT substrate to be described later. In other words, the drive electrodes COML are formed in the direction of a shorter side of the display unit 10 with a touch detection function, and the touch detection electrodes TDL are formed in the direction of a longer side of the display unit 10 with a touch detection function. The outputs of the touch detection electrodes TDL are provided on the shorter side of the display unit 10 with a touch detection function and are connected to the touch detection unit 40 mounted outside the module through a terminal portion T configured by a flexible substrate or the like. The drive electrode driver 14 is formed on the TFT substrate 21 that is a glass substrate. The COG 19A is a chip mounted on the TFT substrate 21 and has circuits such as the control unit 11, the gate driver 12, and the source driver 13, which are illustrated in FIG. 4, necessary for a display operation built therein. As illustrated in FIG. 8, the display device 1 with a touch detection function may have the drive electrode driver 14 built in the chip on glass (COG).

As illustrated in FIG. 8, in the display device 1 with a touch detection function, the module includes a COG 19B. In the COG 19B illustrated in FIG. 8, in addition to the above-described circuits necessary for the display operation, the drive electrode driver 14 is further built in. As will be described later, the display device 1 with a touch detection function performs line sequential scanning of each one horizontal line at the time of performing a display operation. In other words, the display device 1 with a touch detection function performs display scanning in parallel with the direction of the shorter side of the display unit 10 with a touch detection function. On the other hand, the display device 1 with a touch detection function sequentially applies a drive signal Vcom to the drive electrode COML at the time of performing a touch detection operation, thereby performing line sequential scanning for each one detection line. In other words, the display device 1 with a touch detection function performs touch detection scanning in parallel with the direction of the longer side of the display unit 10 with a touch detection function.

As described above, the display device 1 with a touch detection function, which is illustrated in FIGS. 7 and 8, outputs the touch detection signal Vdet from the shorter side of the display unit 10 with a touch detection function. This allows the display device 1 with a touch detection function to decrease the number of touch detection electrodes TDL, and accordingly, the routing of wirings for connecting the touch detection electrodes to the touch detection unit 40 through the terminal portion T can be performed in an easy manner. According to the display device 1 with a touch detection function illustrated in FIG. 8, the drive electrode driver 14 is built in the COG 19B, and accordingly, the frame can be formed to be narrow.

Display Unit 10 with Touch Detection Function

An example of the configuration of the display unit 10 with a touch detection function will be described in detail.

Figure 9:
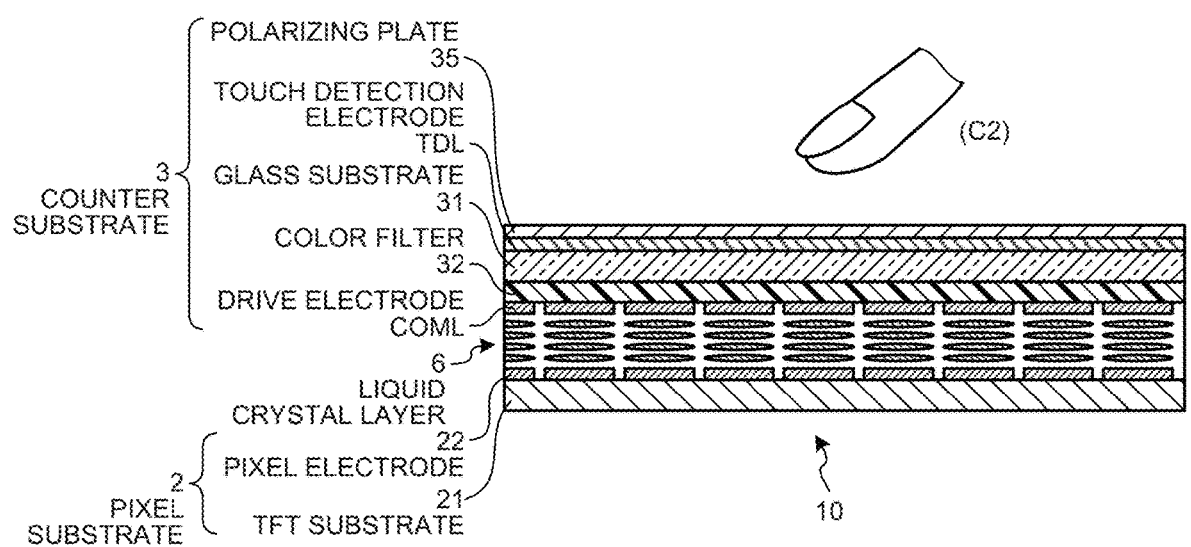
FIG. 9 is a cross-sectional view that illustrates a schematic cross-section structure of the display unit with a touch detection function according to the first embodiment.
Figure 10:
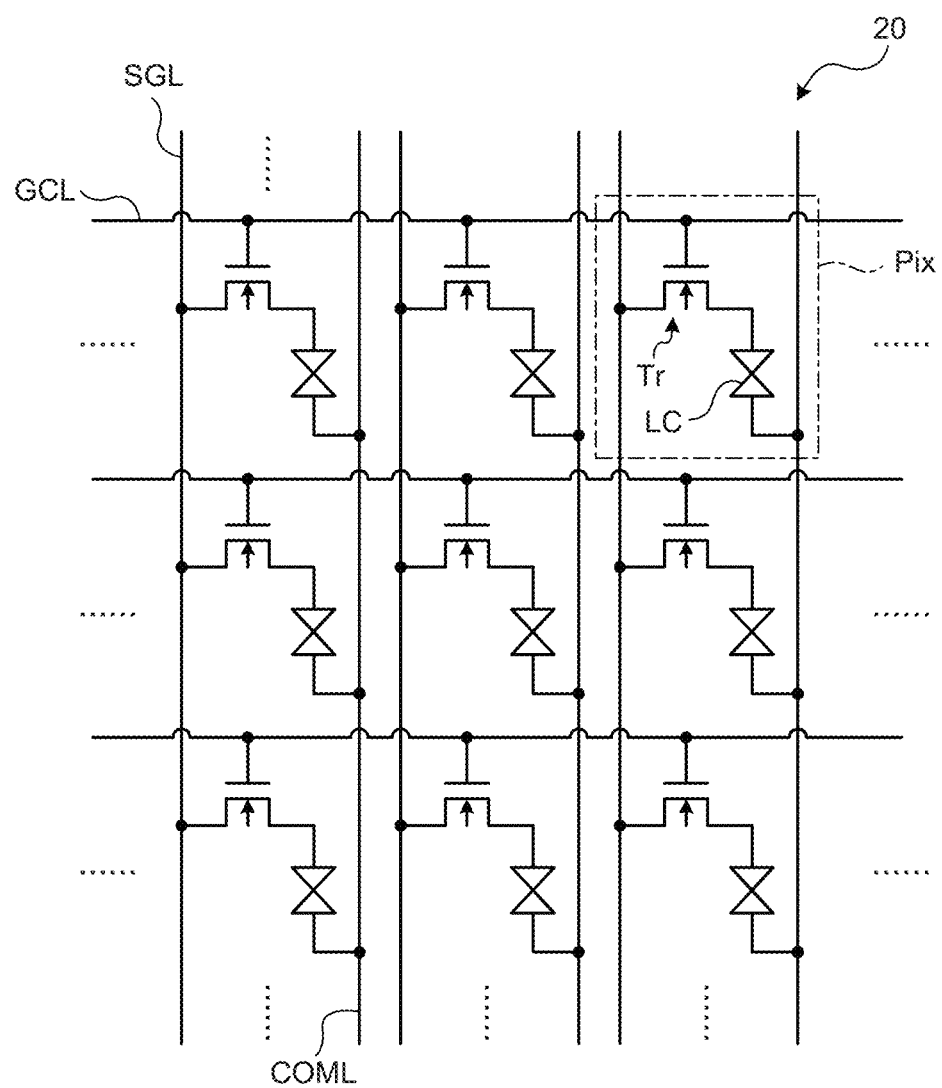
FIG. 10 is a circuit diagram that illustrates a pixel array of the display unit with a touch detection function according to the first embodiment.

FIG. 9 is a cross-sectional view that illustrates a schematic cross-section structure of the display unit with a touch detection function according to the first embodiment. FIG. 10 is a circuit diagram that illustrates a pixel array of the display unit with a touch detection function according to the first embodiment. The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3.

The pixel substrate 2 includes a TFT substrate 21 as a circuit board and a plurality of pixel electrodes 22 arranged on the TFT substrate 21 in a matrix. On the TFT substrate 21, a thin film transistor (TFT) element Tr of each pixel Pix and wirings such as a pixel signal line SGL supplying a pixel signal Vpix to each pixel electrode 22 and a scanning signal line GCL driving each TFT element Tr are formed as illustrated in FIG. 10. In this way, the pixel signal lines SGL extend on a plane parallel to the surface of the TFT substrate and supply a pixel signal used for displaying an image in the pixels. The liquid crystal display unit 20 illustrated in FIG. 10 includes a plurality of pixels Pix arranged in a matrix. Each of the pixels Pix includes a TFT element Tr and a liquid crystal element LC. The TFT element Tr is configured by a thin film transistor and, in this example, is configured by a TFT of the n-channel metal oxide semiconductor (MOS) type. The TFT element Tr has a source connected to the pixel signal line SGL, a gate connected to the scanning signal line GCL, and a drain connected to one end of the liquid crystal element LC. The liquid crystal element LC has one end connected to the drain of the TFT element Tr and the other end connected to the drive electrode COML.

A pixel Pix and another pixel Pix belonging to the same row of the liquid crystal display unit 20 are connected to each other by the scanning signal line GCL. The scanning signal line GCL is connected to the gate driver 12 and is supplied with a scanning signal Vscan from the gate driver 12. A pixel Pix and another pixel Pix belonging to the same column of the liquid crystal display unit 20 are connected to each other by the pixel signal line SGL. The pixel signal line SGL is connected to the source driver 13 and is supplied with a pixel signal Vpix from the source driver 13. The pixel Pix and another pixel Pix belonging to the same column of the liquid crystal display unit 20 are connected to each other by the drive electrode COML. The drive electrode COML is connected to the drive electrode driver 14 and is supplied with a drive signal Vcom from the drive electrode driver 14. In other words, in this example, a plurality of pixels Pix belong to the same column are configured to share one drive electrode COML.

The gate driver 12 illustrated in FIG. 1 applies a scanning signal Vscan to the gate of the TFT element Tr of the pixels Pix through the scanning signal line GCL illustrated in FIG. 10, thereby sequentially selecting one row (one horizontal line) from among pixels Pix formed in a matrix in the liquid crystal display unit 20 as a target of display driving. The source driver 13 illustrated in FIG. 1 supplies a pixel signal Vpix to each pixel Pix configuring one horizontal line, which is sequentially selected by the gate driver 12, through the pixel signal line SGL illustrated in FIG. 10. Thus, these pixels Pix display one horizontal line in accordance with the supplied pixel signal Vpix. The drive electrode driver 14 illustrated in FIG. 1 applies a drive signal Vcom, thereby driving drive electrodes COML for each block that is configured by a predetermined number of the drive electrodes COML illustrated in FIGS. 9 and 10.

As described above, in the liquid crystal display unit 20, one horizontal line is sequentially selected at each time as the gate driver 12 performs driving such that line sequential scanning is performed for the scanning signal lines GCL in a time divisional manner. Further, in the liquid crystal display unit 20, the source driver 13 supplies a pixel signal Vpix to pixels Pix belonging to one horizontal line, whereby each one horizontal line is displayed. When this display operation is performed, the drive electrode driver 14 is configured to apply a drive signal Vcom to a block including drive electrodes COML corresponding to the one horizontal line.

The counter substrate 3 includes: a glass substrate 31; a color filter 32 formed on one face of the glass substrate 31; and a plurality of drive electrodes COML formed on the surface of the color filter 32 that is opposite to the glass substrate 31. On the other face of the glass substrate 31, touch detection electrodes TDL that are detection electrodes of the touch detection device 30 are formed, and a polarizing plate 35 is arranged on the touch detection electrode TDL.

In the color filter 32, for example, color filters colored in three colors of red (R), green (G), and blue (B) are cyclically arranged, and three colors of R, G, and B are associated with each pixel Pix illustrated in FIG. 10 described above as one set. The color filter 32 faces the liquid crystal layer 6 in a direction perpendicular to the TFT substrate. When the color filter 32 is colored in different colors, a set of different colors may be employed.

The drive electrode COML according to the embodiment serves as a common drive electrode of the liquid crystal display unit 20 and also serves as a drive electrode of the touch detection device 30. In this embodiment, one drive electrode COML is arranged to be in correspondence with one pixel electrode 22 (pixel electrodes 22 configuring one column). The drive electrode COML according to the first embodiment faces the pixel electrode 22 in a direction perpendicular to the surface of the TFT substrate 21 and extends in a direction parallel to the direction in which the above-described pixel signal line SGL extends. The drive electrode COML is configured to be applied with a drive signal Vcom having an AC rectangular waveform to the drive electrode COML from the drive electrode driver 14 through a contact conductive pillar, which is not illustrated in the figure, having conductivity.

The liquid crystal layer 6 modulates light passing therethrough in accordance with the state of electric fields thereof. In the liquid crystal layer 6, a liquid crystal of various modes such as a twisted nematic (TN) mode, a vertical alignment (VA) mode, and an electrically controlled birefringence (ECB) mode is used.

Between the liquid crystal layer 6 and the pixel substrate 2 and between the liquid crystal layer 6 and the counter substrate 3, an orientation film may be respectively arranged. An incident side polarizing plate may be arranged on the lower face side of the pixel substrate 2.

Figure 11:
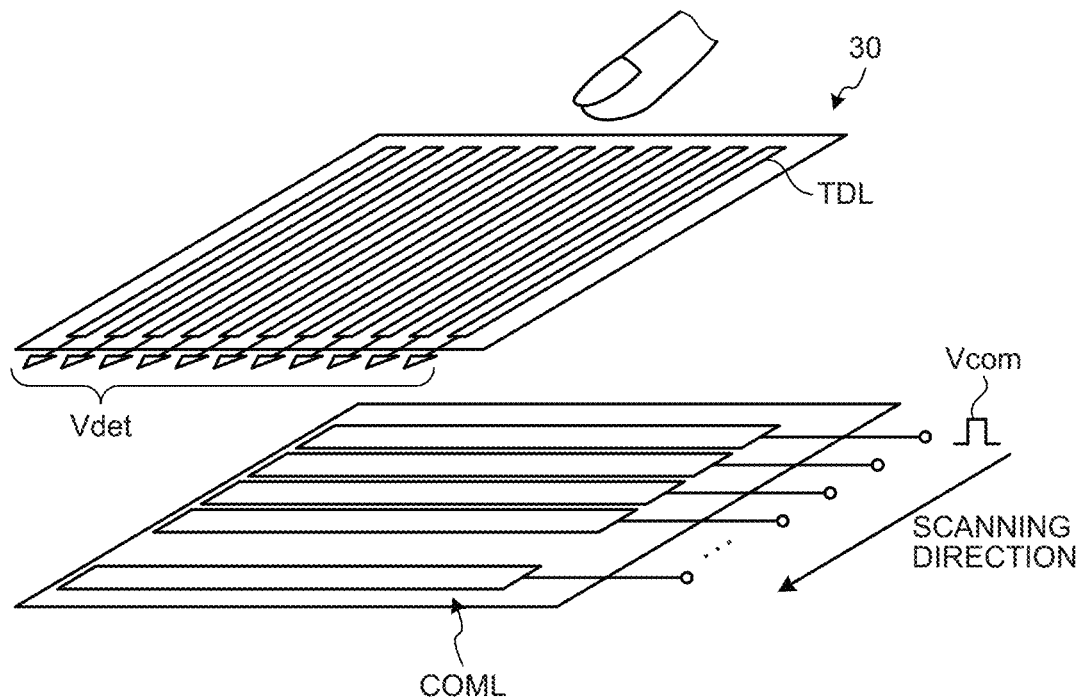
FIG. 11 is a perspective view that illustrates an example of the configuration of drive electrodes and touch detection electrodes of the display unit with a touch detection function according to the first embodiment.

FIG. 11 is a perspective view that illustrates an example of the configuration of the drive electrodes and the touch detection electrodes of the display unit with a touch detection function according to the first embodiment. The touch detection device 30 is configured by the drive electrodes COML and the touch detection electrodes TDL provided on the counter substrate 3. The drive electrodes COML are configured by a plurality of stripe-shaped electrode patterns extending in the horizontal direction in the figure. When a touch detection operation is performed, a drive signal Vcom is sequentially supplied to each electrode pattern by the drive electrode driver 14, and line sequential scanning driving is performed in a time divisional manner as will be described later. The touch detection electrodes TDL are configured by stripe-shaped electrode patterns extending in a direction intersecting the extending direction of the electrode patterns of the drive electrodes COML. The touch detection electrodes TDL face the drive electrodes COML in a direction perpendicular to the surface of the TFT substrate 21. Each electrode pattern of the touch detection electrode TDL is connected to the input of the analog LPF unit 42 of the touch detection unit 40. Electrode patterns intersecting each other of the drive electrodes COML and the touch detection electrodes TDL generate electrostatic capacitance in each of the intersecting portions thereof.

By employing such a configuration, in the touch detection device 30, when the touch detection operation is performed, the drive electrode driver 14 drives the drive electrodes COML as a drive electrode block in a time divisional manner so as to perform line sequential scanning, and accordingly, each detection block of the drive electrode COML is sequentially selected. Then, by outputting a touch detection signal Vdet from the touch detection electrode TDL, touch detection for one detection block is performed. In other words, the drive electrode block corresponds to the drive electrode E1 illustrated in the above-described basic principle of the touch detection, the touch detection electrode TDL corresponds to the touch detection electrode E2, and the touch detection device 30 detects a touch based on this basic principle. As illustrated in FIG. 11, the electrode patterns intersecting each other configures touch sensors of the capacitance type in a matrix. Accordingly, by scanning the whole touch detection face of the touch detection device 30, a position at which an external proximity object is in contact with or in proximity to the touch detection face can be detected as well.

Here, the TFT substrate 21 corresponds to a specific example of a "substrate" in the present disclosure. The pixel electrode 22 corresponds to a specific example of a "pixel electrode" in the present disclosure. The pixel signal line SGL corresponds to a specific example of a "signal line" in the present disclosure. The drive electrode COML corresponds to a specific example of a "drive electrode" in the present disclosure. The liquid crystal elements LC correspond to a specific example of a "display functional layer" in the present disclosure. The source driver 13 and the drive electrode driver 14 correspond to a specific example of a "scanning drive unit" in the present disclosure. The touch detection unit 40 corresponds to a specific example of a "detection processing unit" in the present disclosure. The touch detection electrode TDL corresponds to a specific example of a "touch detection electrode" in the present disclosure. The color filter 32 corresponds to a specific example of a "color filter" in the present disclosure.

1-1B. Operation and Action

The operation and the action of the display device 1 with a touch detection function according to the first embodiment will be described.

Since the drive electrode COML serves both as a drive electrode of the touch detection device 30 and as a common drive electrode of the liquid crystal display unit 20, there is a possibility that the drive signal Vcom influences with each other. Accordingly, the drive signal Vcom is applied to the drive electrode COML separately in a display period B during which a display operation is performed and in a touch detection period A during which a touch detection operation is performed. In the display period B in which the display operation is performed, the drive electrode driver 14 applies the drive signal Vcom as a display drive signal. On the other hand, in the touch detection period A in which the touch detection operation is performed, the drive electrode driver 14 applies the drive signal Vcom as a touch drive signal. In description presented below, the drive signal Vcom as a display drive signal may be referred to as a display drive signal Vcomd, and the drive signal Vcom as a touch drive signal may be referred to as a touch drive signal Vcomt.

Overview of Overall Operation

The control unit 11 supplies control signals to the gate driver 12, the source driver 13, the drive electrode driver 14, and the touch detection unit 40 based on a video signal Vdisp supplied from the outside, thereby performing control such that the units operate in synchronization with each other. In the display period B, the gate driver 12 supplies a scanning signal Vscan to the liquid crystal display unit 20, thereby sequentially selecting one horizontal line that is a target of the display drive. In the display period B, the source driver 13 supplies a pixel signal Vpix to each pixel Pix configuring one horizontal line selected by the gate driver 12.

In the display period B, the drive electrode driver 14 applies a display drive signal Vcomd to a drive electrode block relating to one horizontal line, and, in the touch detection period A, the drive electrode driver 14 sequentially applies a touch drive signal Vcomt of a frequency higher than that of the display drive signal Vcomd to drive electrode blocks relating to a touch detection operation, whereby one detection block is sequentially selected. In the display period B, the display unit 10 with a touch detection function performs a display operation based on signals supplied by the gate driver 12, the source driver 13, and the drive electrode driver 14. In the touch detection period A, the display unit 10 with a touch detection function performs a touch detection operation based on a signal supplied by the drive electrode driver 14 and outputs a touch detection signal Vdet from the touch detection electrode TDL. The analog LPF unit 42 amplifies the touch detection signal Vdet and outputs the amplified touch detection signal. The A/D conversion unit 43 converts an analog signal output from the analog LPF unit 42 into a digital signal at timing synchronized with the touch drive signal Vcomt. The signal processing unit 44 detects a presence or no presence of a touch on the touch detection device 30 based on an output signal of the A/D conversion unit 43. When touch detection is made by the signal processing unit 44, the coordinate extracting unit 45 acquires touch panel coordinates thereof. The control unit 11 changes the sampling frequency of the touch drive signal Vcomt by controlling the detection timing control unit 46.

Detailed Operation

Figure 12:
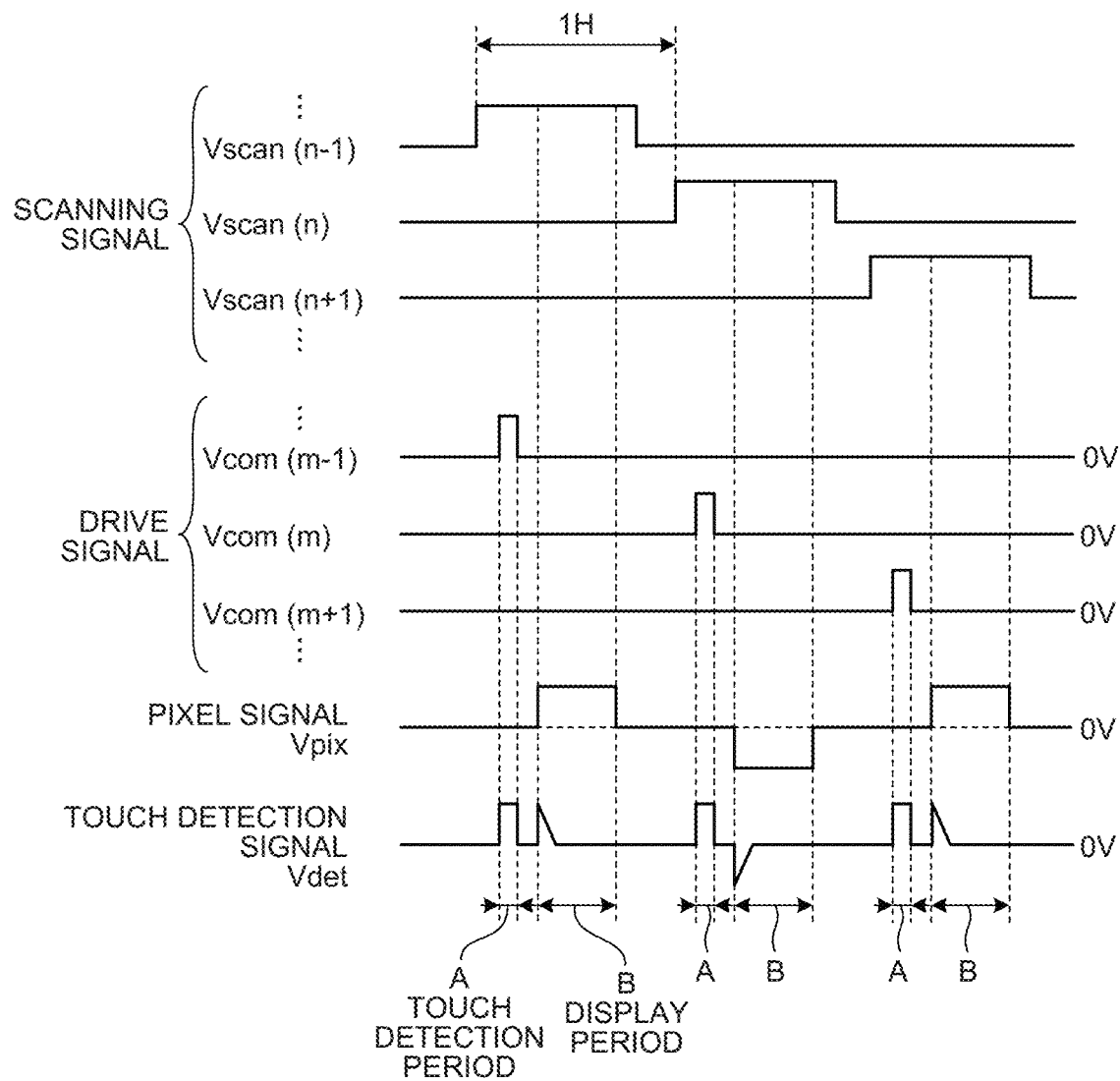
FIG. 12 is a timing waveform chart that illustrates an example of the operation of the display device with a touch detection function according to the first embodiment.

A detailed operation of the display device 1 with a touch detection function will be described. FIG. 12 is a timing waveform chart that illustrates an example of the operation of the display device with a touch detection function according to the first embodiment. As illustrated in FIG. 12, the liquid crystal display unit 20 performs a display by sequentially scanning each one horizontal line of scanning signal lines GCL in order of (n−1)-th row, the n-th row adjacent thereto, and the (n+1)-th row adjacent thereto out of the scanning signal line GCL in accordance with a scanning signal Vscan supplied from the gate driver 12. Similarly, the drive electrode driver 14 sequentially supplies a drive signal to drive electrodes COML in order of (m−1)-th column, the m-th column adjacent thereto, and the (m+1)-th column adjacent thereto out of the drive electrodes COML of the display unit 10 with a touch detection function based on a control signal supplied from the control unit 11.

As describe above, in the display device 1 with a touch detection function, a touch detection operation (touch detection period A) and a display operation (display period B) are performed in a time divisional manner for each one display horizontal period (1H). In the touch detection operation, scanning for touch detection is performed by selecting a different drive electrode COML and applying a drive signal Vcom to the selected drive electrode for each one display horizontal period 1H. The operation will be described in detail as below.

First, the gate driver 12 applies a scanning signal Vscan to the scanning signal line GCL of the (n−1)-th row, whereby the scanning signal Vscan (n−1) is changed from a low level to a high level. Thus, one display horizontal period 1H is started.

Then, in the touch detection period A, the drive electrode driver 14 applies a drive signal Vcom to the drive electrode COML of the (m−1)-th column, whereby the drive signal Vcom (m−1) is changed from the low level to the high level. This drive signal Vcom (m−1) is propagated to the touch detection electrode TDL through an electrostatic capacitance, whereby the touch detection signal Vdet is changed. Then, when the drive signal Vcom (m−1) is changed from the high level to the low level, the touch detection signal Vdet is similarly changed. The waveform of the touch detection signal Vdet in the touch detection period A corresponds to the touch detection signal Vdet of the above-described basic principle of the touch detection. The A/D conversion unit 43 performs A/D conversion of the touch detection signal Vdet in the touch detection period A, thereby performing touch detection. Thus, the display device 1 with a touch detection function performs touch detection of one detection line.

Then, in the display period B, the source driver 13 applies a pixel signal Vpix to the pixel signal lines SGL, thereby performing a display of one horizontal line. As illustrated in FIG. 12, a change in the pixel signal Vpix is propagated to the touch detection electrode TDL through parasitic capacitance, and accordingly, the touch detection signal Vdet may change. However, in the display period B, by configuring the A/D conversion unit 43 not to perform A/D conversion, the influence of the change in the pixel signal Vpix on the touch detection can be suppressed. After the supply of the pixel signal Vpix from the source driver 13 ends, the gate driver 12 changes the scanning signal Vscan (n−1) of the scanning signal line GCL of the (n−1)-th row from the high level to the low level, and the one display horizontal period ends.

Then, the gate driver 12 applies a scanning signal Vscan to the scanning signal line GCL of the n-th row that is different from the previous row, whereby the scanning signal Vscan (n) is changed from the low level to the high level, thus, the next one display horizontal period is started.

In the next touch detection period A, the drive electrode driver 14 applies a drive signal Vcom to the drive electrode COML of the m-th column different from the previous drive electrode. Then, A/D conversion of a change in the touch detection signal Vdet is performed by the A/D conversion unit 43, whereby touch detection of this one detection line is performed.

Then, in the display period B, the source driver 13 applies a pixel signal Vpix to the pixel signal line SGL, thereby performing a display of one horizontal line. Since the display device 1 with a touch detection function according to the present embodiment performs dot-inversion driving, the polarity of the pixel signal Vpix applied by the source driver 13 is inverted from that of the previous one display horizontal period. After the display period B ends, this one display horizontal period 1H ends.

Thereafter, by repeating the above-described operations, the display device 1 with a touch detection function performs a display operation by scanning the whole the display face and performs a touch detection operation by scanning the whole touch detection face.

As described above, the display device 1 with a touch detection function operates such that the direction in which the display scanning is performed is different from the direction in which the touch detection scanning is performed. This means that, during one display horizontal period (1H), both the display operation and the touch detection operation are necessarily performed for a pixel Pix. In the display device 1 with a touch detection function, in one display horizontal period (1H), the touch detection operation is performed in the touch detection period A, and the display operation is performed in the display period B. As described above, since the touch detection operation and the display operation are performed in periods different from each other, both the display operation and the touch detection operation can be performed during the same one display horizontal period, and the influence of the display operation on the touch detection can be suppressed.

Arrangement of Touch Detection Electrode

Figure 13:
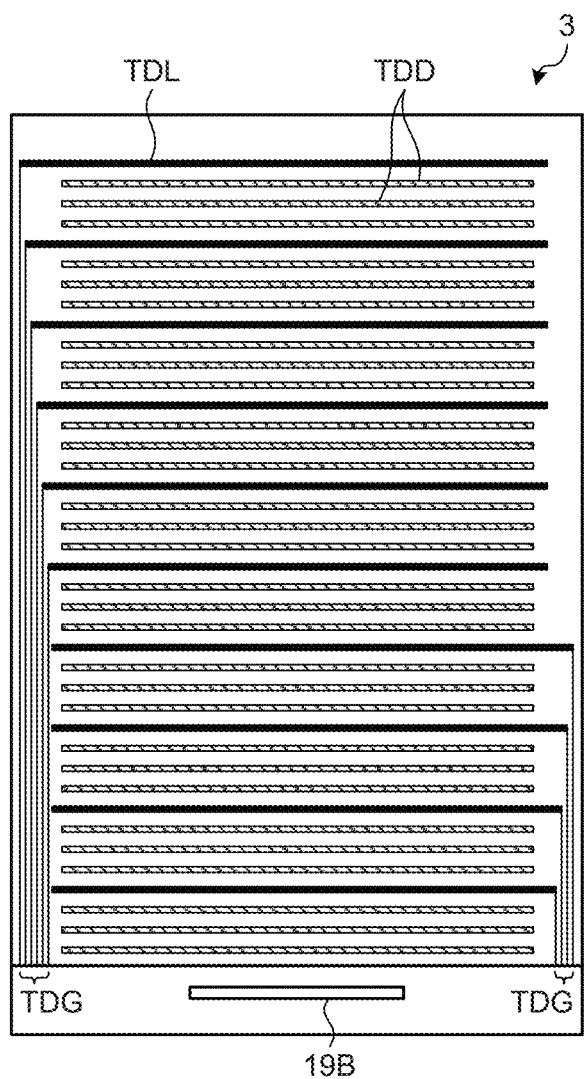
FIG. 13 is a schematic diagram that illustrates the arrangement of touch detection electrodes according to the first embodiment.
Figure 14:
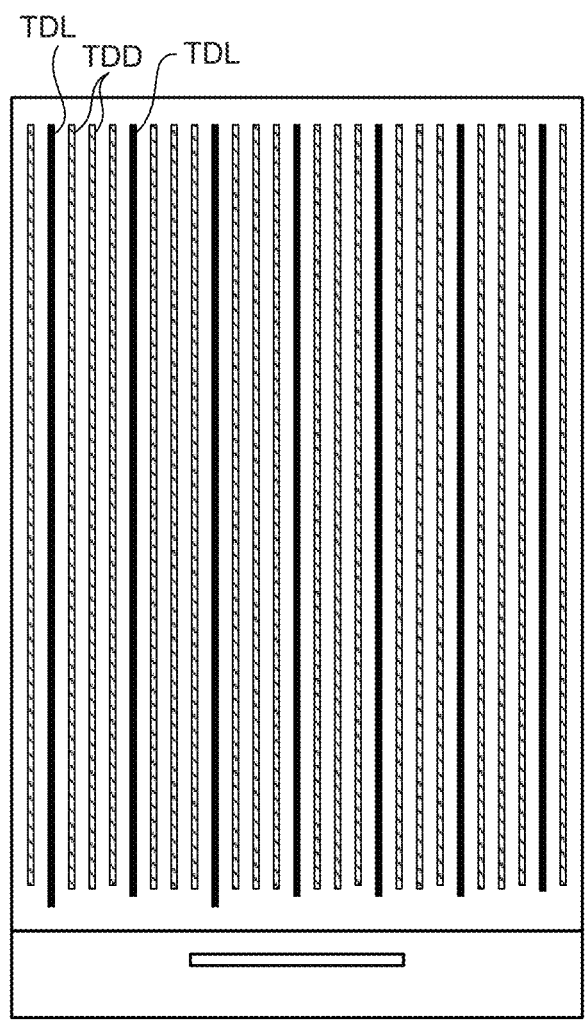
FIG. 14 is a schematic diagram that illustrates the arrangement of touch detection electrodes of a comparative example.
Figure 15:
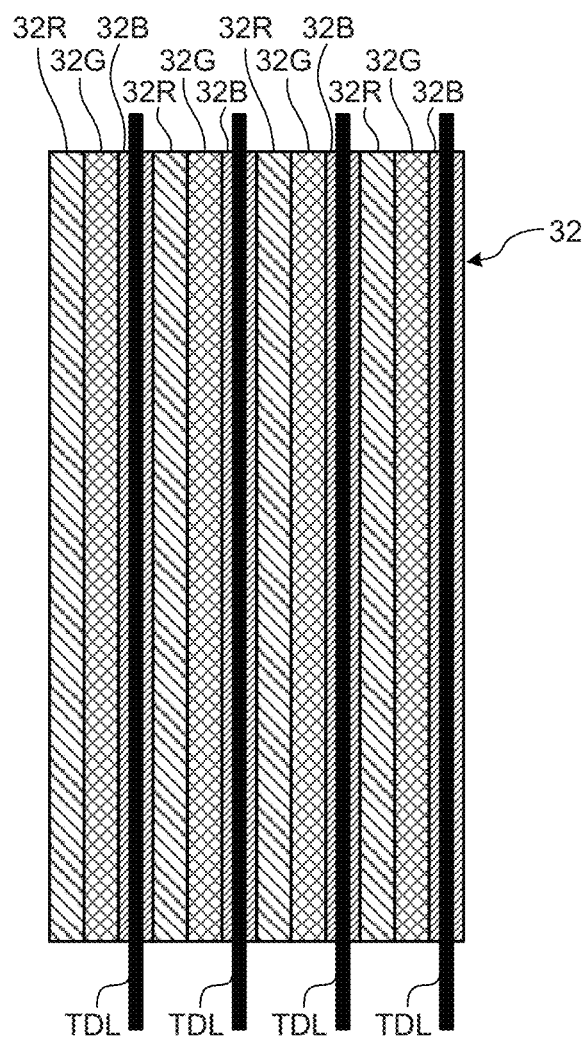
FIG. 15 is a schematic diagram that illustrates the relation between the arrangement of touch detection electrodes and color areas of a color filter of the comparative example.

FIG. 13 is a schematic diagram that illustrates the arrangement of touch detection electrodes according to the first embodiment. FIG. 14 is a schematic diagram that illustrates the arrangement of touch detection electrodes of a comparative example. FIG. 15 is a schematic diagram that illustrates the relation between the arrangement of touch detection electrodes and color areas of color filters of the comparative example.

As illustrated in FIG. 13, the touch detection electrodes TDL according to the first embodiment, which are arranged on the counter substrate 3, are connected to the touch detection unit 40 through detection wirings TDG. The touch detection electrode TDL is formed of a metal material of at least one of aluminum (Al), copper (Cu), silver (Ag) and an alloy thereof. The metal material of at least one of aluminum (Al), copper (Cu), silver (Ag), and an alloy thereof has resistance lower than a transparent conductive oxide such as an indium tin oxide (ITO) as the material of a transparent electrode. The metal material of at least one of aluminum (Al), copper (Cu), silver (Ag), and an alloy thereof has a light shielding property higher than a transparent conductive oxide such as ITO, and accordingly, there is a possibility that the transmittance may decrease, or the pattern of the touch detection electrode TDL may be visually recognized.

Accordingly, in the counter substrate 3, dummy terminals TDD, which are not connected to the touch detection unit 40, are arranged between the touch detection electrodes TDL in parallel with the extending direction of the touch detection electrode TDL. The dummy electrode TDD is formed of a material that is the same as the material of the touch detection electrode TDL. Thus, the visual recognition of the touch detection electrodes due to light shielding of the touch detection electrodes TDL is relieved. Description of a predetermined pitch of metal wirings of the touch detection electrodes TDL in the first, second, third, and fourth embodiments and modifications to be presented below may be applied also to a predetermined pitch between metal wirings of the dummy electrodes TDD (the pitch of touch detection electrodes). Similarly, description of a predetermined pitch of metal wirings of the touch detection electrodes TDL (the pitch of the touch detection electrodes) in the first, second, third, and fourth embodiments and modifications to be presented below may be applied to a predetermined pitch of a metal wiring of the touch detection electrode TDL and a metal wiring of the dummy electrode TDD.

As described above, the drive electrodes COML according to the first embodiment face the pixel electrodes 22 in a direction perpendicular to the surface of the TFT substrate 21 and extend in a direction parallel to the extending direction of the pixel signal lines SGL as described above. Accordingly, the touch detection electrodes TDL illustrated in FIG. 13 are metal wirings extending in a direction different from a direction in which the pixel signal lines SGL supplying a pixel signal Vpix to each pixel electrode 22 illustrated in FIG. 10 extend, and the metal wirings are arranged with a predetermined pitch.

Incidentally, in some cases, the drive electrodes COML face the pixel electrodes 22 in a direction perpendicular to the surface of the TFT substrate 21 and extend in a direction different from the above-described extending direction in which the pixel signal lines SGL extend. In such a case, the touch detection electrodes TDL illustrated in FIG. 14 are metal wirings extending in a direction parallel to a direction in which the pixel signal lines SGL supplying the pixel signal Vpix to each pixel electrode 22 illustrated in FIG. 10 extend, and the metal wirings are arranged with a predetermined pitch. In a case where the metal wirings of the touch detection electrodes TDL are arranged as illustrated in FIG. 14, as illustrated in FIG. 15, there is a possibility that the metal wirings shield specific color areas 32B of the color filter. In the color filter 32 illustrated in FIG. 15, there are color areas 32R, 32G, and 32B colored in three colors of red (R), green (G), and blue (B). The color areas 32R, 32G, and 32B, usually, extend in the extending direction of the pixel signal lines SGL. Since the touch detection electrodes TDL illustrated in FIG. 15 are metal wirings extending in a direction parallel to the extending direction of the pixel signal lines SGL, for example, there is a possibility that only the color areas 32B are shielded so that the color to be originally displayed by the liquid crystal display unit 20 is shifted.

Figure 16:
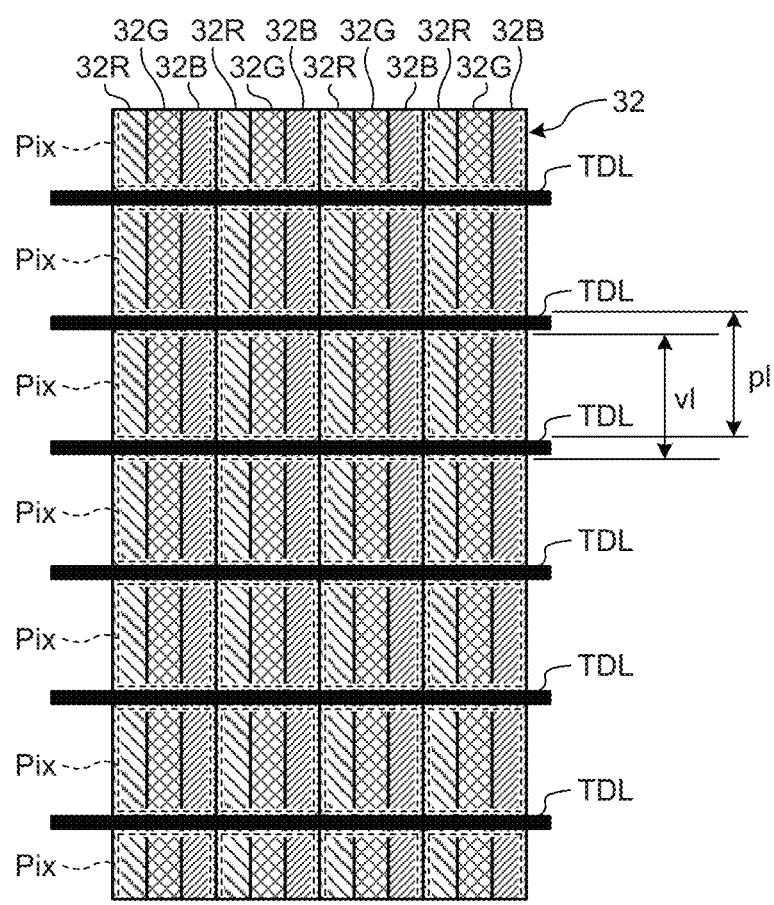
FIG. 16 is a schematic diagram that illustrates the relation between the arrangement of touch detection electrodes and color areas of a color filter according to the first embodiment.

FIG. 16 is a schematic diagram that illustrates the relation between the arrangement of touch detection electrodes and color areas of a color filter according to the first embodiment. In a case where the touch detection electrodes TDL are metal wirings extending in a direction different from the extending direction of the pixel signal lines SGL as illustrated in FIG. 13, as illustrated in FIG. 16, the color areas 32R, 32G, and 32B of the color filter 32 and the touch detection electrodes TDL cross over each other. Accordingly, the touch detection electrodes TDL uniformly shield light in the color areas 32R, 32G, and 32B. As a result, the possibility of shifting the color to be originally displayed by the liquid crystal display unit 20 can be suppressed.

As illustrated in FIG. 16, the touch detection electrodes TDL are arranged at intervals of a natural number multiple (for example, one time) of the pixel pitch vl between pixels Pix of a plurality of pixel electrodes 22 arranged in a matrix. In this case, a touch detection electrode pitch pl that is an interval between adjacent touch detection electrodes TDL is the same as the pixel pitch vl of the pixels Pix in the extending direction of the touch detection electrodes TDL. The touch detection electrode pitch pl may be a natural number multiple of the pixel pitch vl that is one to ten times the pixel pitch, depending on the pixel size. The touch detection electrode pitch pl may be an interval of 50 μm to 500 μm, depending on the pixel size. Thus, the touch detection electrode TDL passes through the edge portion of the pixel Pix, and accordingly, a decrease in the transmittance of the pixel Pix can be suppressed. As a countermeasure against moire, the touch detection electrode pitch pl may have a variation, and the touch detection electrodes may be randomly arranged in a range of about 10% (for example, 50 μm in a case where the pitch is 500 μm) of "the width of the display area/the number of detection electrodes." Here, the number of detection electrodes is a total number of dummy electrodes TDD and touch detection electrodes TDL, and the width of the display area is the length of the displayable area of the liquid crystal display unit 20 in a direction perpendicular to the extending direction of the touch detection electrodes TDL.

1-1C. Advantage

As described above, according to the display device 1 with a touch detection function according to the first embodiment, although the metal touch detection electrodes TDL are used, a decrease in the transmittance or visual recognition of the patterns of the touch detection electrodes TDL due to the metal touch detection electrodes TDL is suppressed. As a result, the touch detection electrodes TDL have low resistance, and the display device 1 with a touch detection function can be formed to be thin, have a large screen, or have high precision.

Further, the display device 1 with a touch detection function according to the first embodiment can suppress the possibility of shifting the color to be originally displayed by the liquid crystal display unit 20.

1-1D. First Modification of First Embodiment

Figure 17:
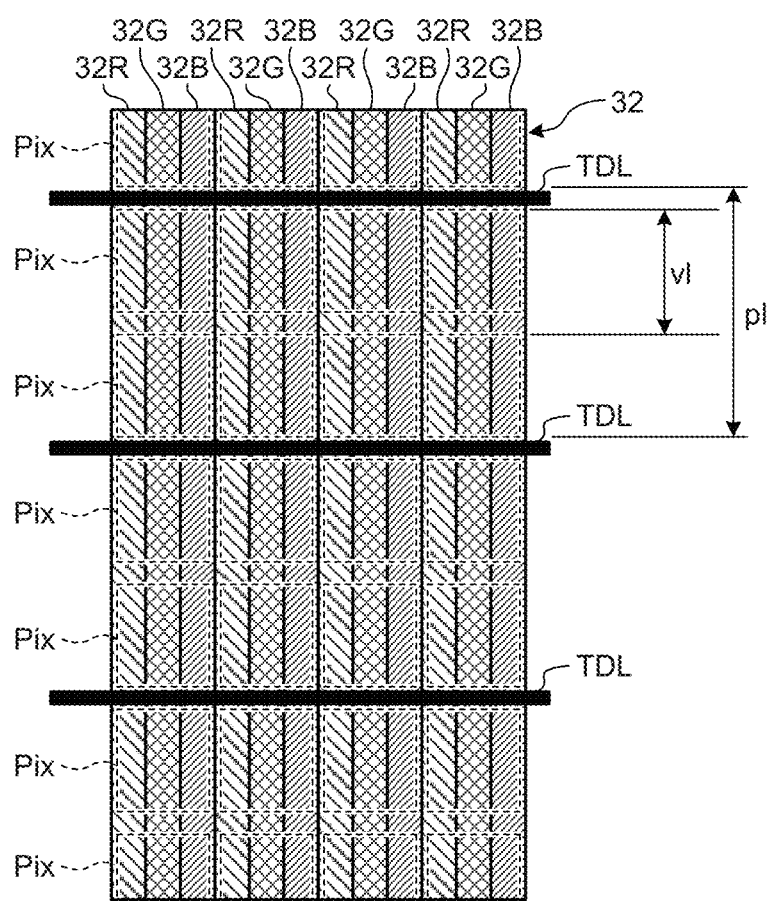
FIG. 17 is a schematic diagram that illustrates the relation between the arrangement of touch detection electrodes and color areas of a color filter according to a first modification of the first embodiment.

FIG. 17 is a schematic diagram that illustrates the relation between the arrangement of touch detection electrodes and color areas of a color filter according to a first modification of the first embodiment. As illustrated in FIG. 17, the touch detection electrodes TDL are arranged at intervals of a natural number multiple (for example, twice) of the pitch of pixels Pix of a plurality of pixel electrodes 22 arranged in a matrix. In this case, a touch detection electrode pitch pl that is an interval between adjacent touch detection electrodes TDL is the same as twice the pixel pitch vl of the pixels Pix in the extending direction of the touch detection electrodes TDL. Thus, the touch detection electrode TDL passes through the edge portion of the pixel Pix, and accordingly, a decrease in the transmittance of the pixel Pix can be suppressed.

1-1E. Second Modification of First Embodiment

Figure 18:
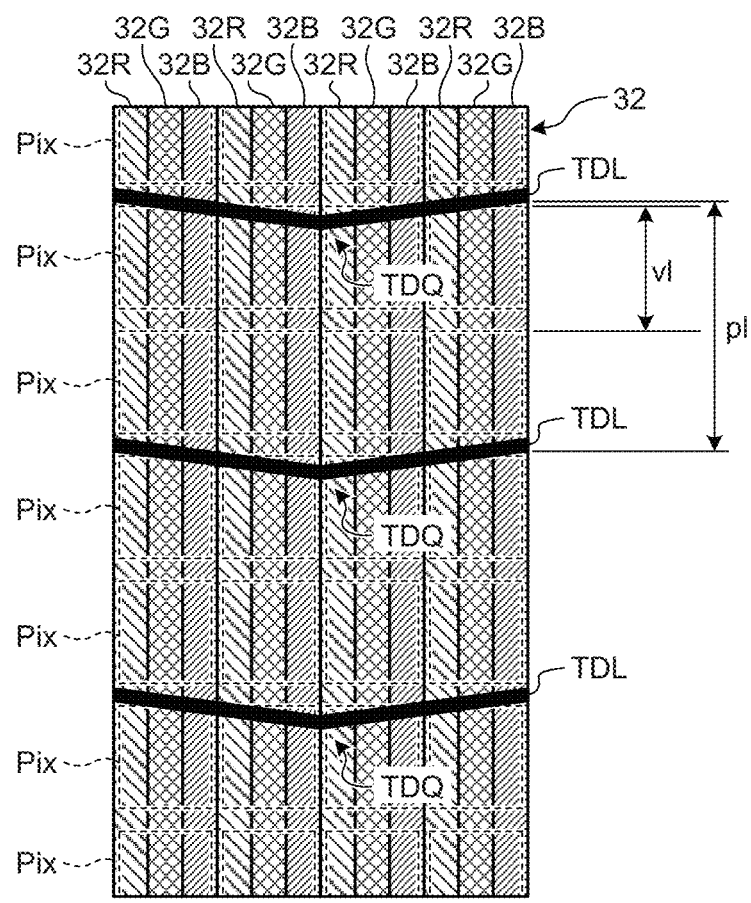
FIG. 18 is a schematic diagram that illustrates the relation between the arrangement of touch detection electrodes and color areas of a color filter according to a second modification of the first embodiment.

FIG. 18 is a schematic diagram that illustrates the relation between the arrangement of touch detection electrodes and color areas of a color filter according to a second modification of the first embodiment. As illustrated in FIG. 18, the touch detection electrodes TDL are arranged at intervals of a natural number multiple (for example, twice) of the pitch of pixels Pix of a plurality of pixel electrodes 22 arranged in a matrix. In this case, a touch detection electrode pitch pl that is an interval between adjacent touch detection electrodes TDL is the same as twice the pixel pitch vl of the pixels Pix in the extending direction of the touch detection electrodes TDL. As illustrated in FIG. 18, the touch detection electrodes TDL are metal wirings extending in a direction different from the extending direction of the pixel signal lines SGL while having a direction and an angle along the edge portion of the pixel Pix by regularly including a bending portion TDQ. By including the bending portion TDQ, light scattered at the touch detection electrode TDL disperses, and the occurrence of a Newton ring or moire can be suppressed by suppressing the interference of light. In the touch detection electrode TDL, as illustrated in FIG. 18, each of the color areas 32R, 32G, and 32B of the color filter 32 and the touch detection electrodes TDL cross over each other.

1-1F. Third Modification of First Embodiment

Figure 19:
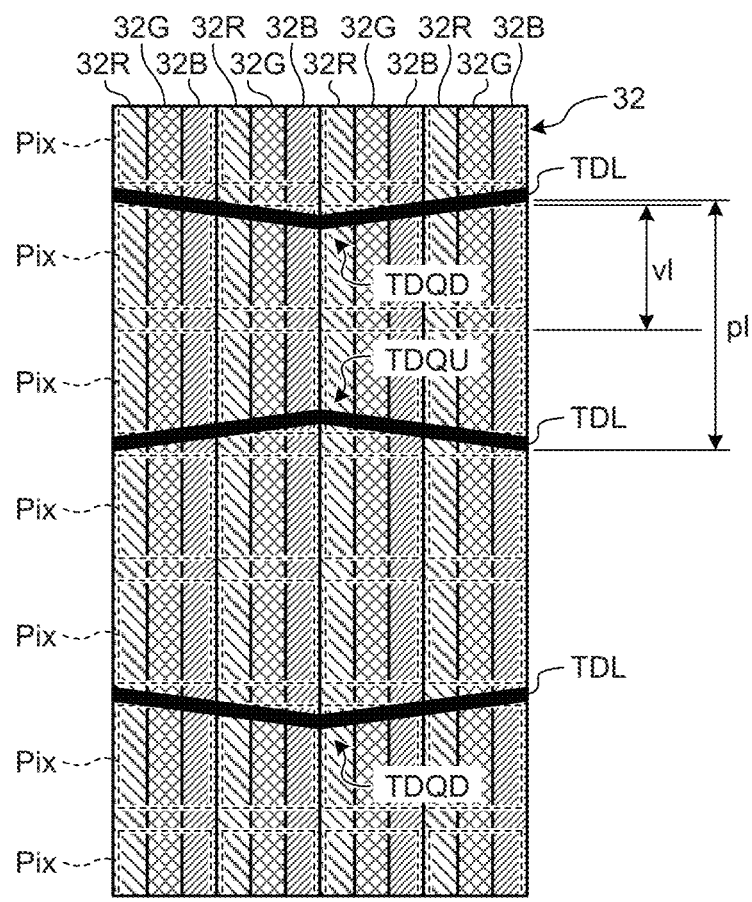
FIG. 19 is a schematic diagram that illustrates the relation between the arrangement of touch detection electrodes and color areas of a color filter according to a third modification of the first embodiment.

FIG. 19 is a schematic diagram that illustrates the relation between the arrangement of touch detection electrodes and color areas of a color filter according to a third modification of the first embodiment. As illustrated in FIG. 19, the touch detection electrodes TDL are arranged at intervals of a natural number multiple (for example, twice) of the pitch of pixels Pix of a plurality of pixel electrodes 22 arranged in a matrix. In this case, a touch detection electrode pitch pl that is an interval between adjacent touch detection electrodes TDL is the same as twice the pixel pitch vl of the pixels Pix in the extending direction of the touch detection electrode TDL. As illustrated in FIG. 19, the touch detection electrodes TDL are metal wirings extending in direction different from the extending direction of the pixel signal lines SGL while having direction and angle along the edge portion of the pixel Pix by regularly including bending portions TDQD and TDQU. By including the bending portions TDQD and TDQU different from each other in the touch detection electrodes TDL adjacent to each other, light scattered at the touch detection electrodes TDL disperses, and the occurrence of a Newton ring or moire can be suppressed by suppressing the interference of light. In the touch detection electrode TDL, as illustrated in FIG. 19, each of the color areas 32R, 32G, and 32B of the color filter 32 and the touch detection electrodes TDL cross over each other.

1-1G. Fourth Modification of First Embodiment

Figure 20:
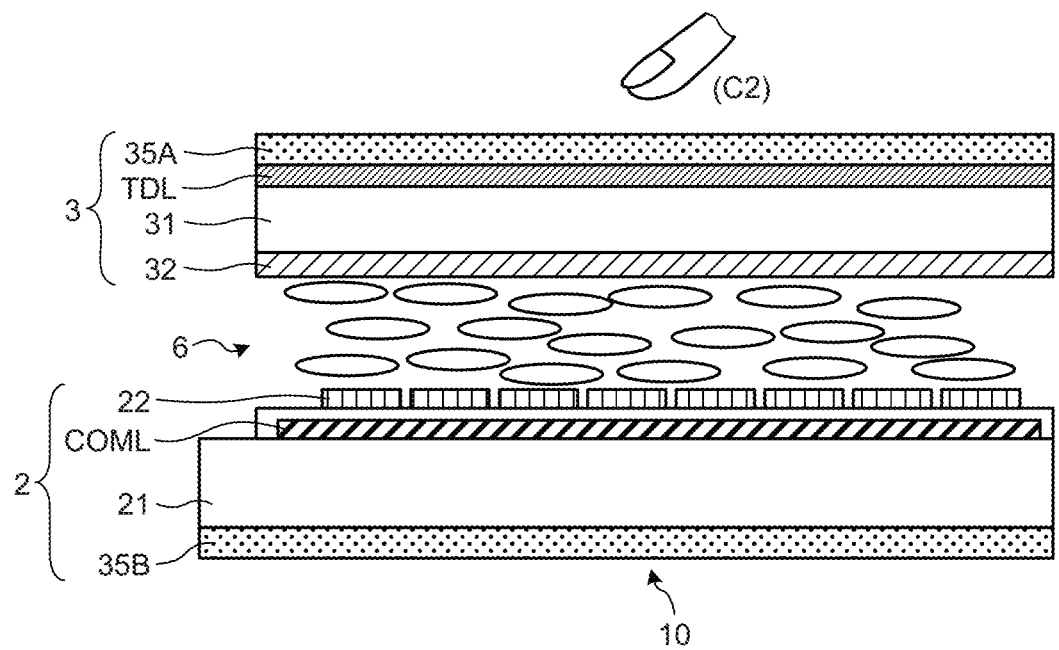
FIG. 20 is a cross-sectional view that illustrates a schematic cross-section structure of a display unit with a touch detection function according to a fourth modification of the first embodiment.

FIG. 20 is a cross-sectional view that illustrates a schematic cross-section structure of a display unit with a touch detection function according to a fourth modification of the first embodiment. The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. The counter substrate 3 includes a glass substrate 31 and a color filter 32 formed on one face of the glass substrate 31. On the other face of the glass substrate 31, touch detection electrodes TDL that are detection electrodes of the touch detection device 30 are formed, and, on the touch detection electrodes TDL, a polarizing plate 35A is arranged.

The pixel substrate 2 includes: a TFT substrate 21 as a circuit board; a plurality of pixel electrodes 22 arranged on the TFT substrate 21 in a matrix; a plurality of drive electrodes COML formed between the TFT substrate 21 and the pixel electrodes 22; and an incident-side polarizing plate 35B arranged on the lower face side of the TFT substrate 21.

1-1H. Fifth Modification of First Embodiment

Figure 21:
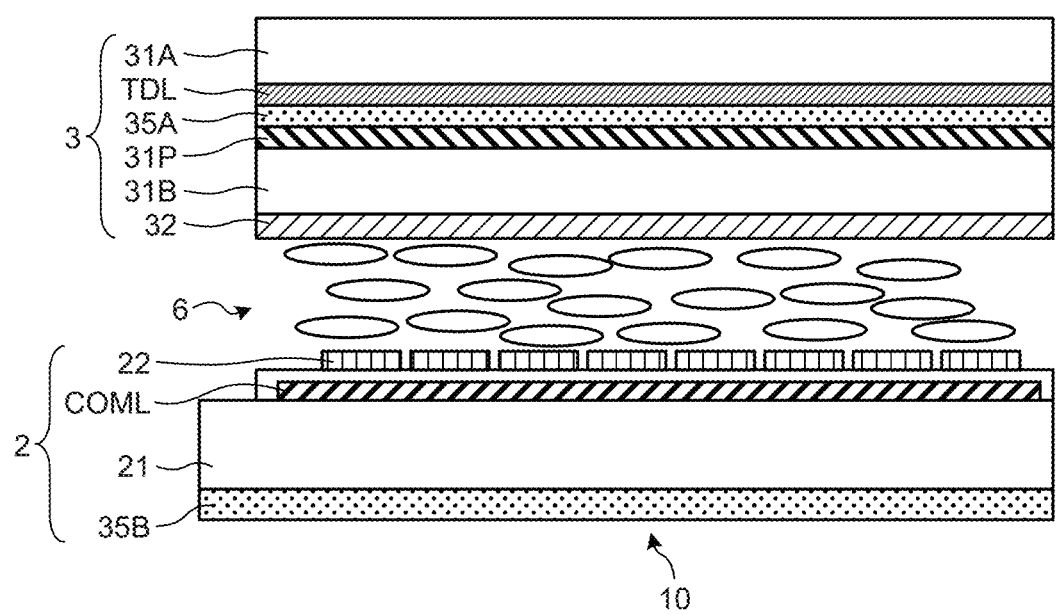
FIG. 21 is a cross-sectional view that illustrates a schematic cross-section structure of a display unit with a touch detection function according to a fifth modification of the first embodiment.

FIG. 21 is a cross-sectional view that illustrates a schematic cross-section structure of a display unit with a touch detection function according to a fifth modification of the first embodiment. The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. In the counter substrate 3, one face of a glass substrate 31A and one face of a glass substrate 31B are bonded together by an adhesive layer 31P. A color filter 32 is formed on the other face of the glass substrate 31B. Touch detection electrodes TDL are formed on one face of the glass substrate 31A, and on the touch detection electrodes TDL, a polarizing plate 35A is arranged. By bonding the glass substrates 31B and 31A to the adhesive layer 31P, the touch detection electrodes TDL are interposed between the glass substrates 31B and 31A.

The pixel substrate 2 includes: a TFT substrate 21 as a circuit board; a plurality of pixel electrodes 22 arranged on the TFT substrate 21 in a matrix; a plurality of drive electrodes COML formed between the TFT substrate 21 and the pixel electrodes 22; and an incident-side polarizing plate 35B arranged on the lower face side of the TFT substrate 21.

1-1I. Sixth Modification of First Embodiment

Figure 22:
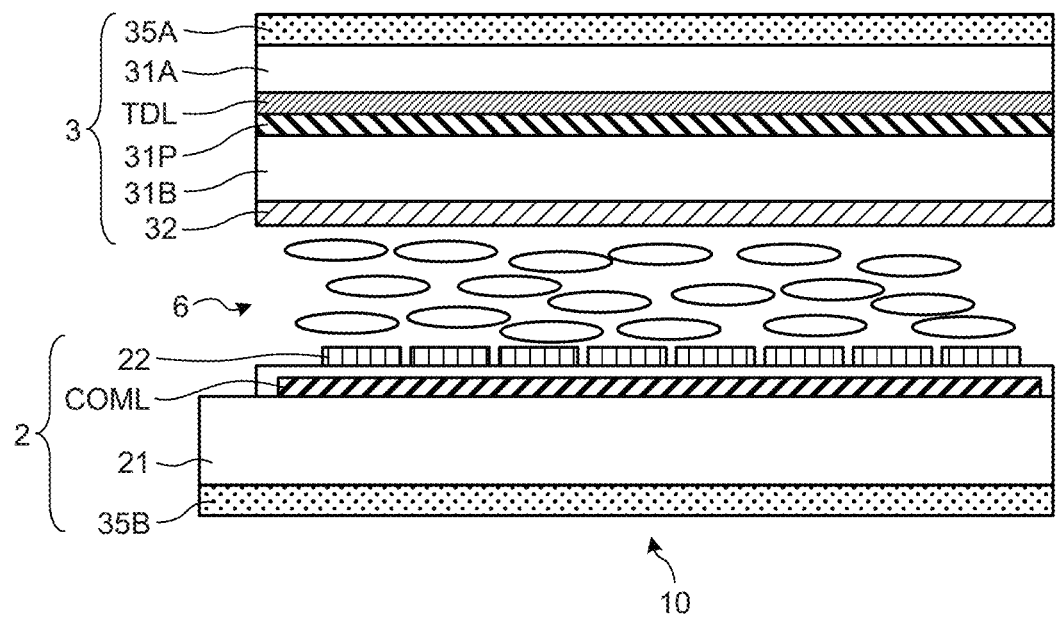
FIG. 22 is a cross-sectional view that illustrates a schematic cross-section structure of a display unit with a touch detection function according to a sixth modification of the first embodiment.

FIG. 22 is a cross-sectional view that illustrates a schematic cross-section structure of a display unit with a touch detection function according to a sixth modification of the first embodiment. The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. In the counter substrate 3, one face of a glass substrate 31A and one face of a glass substrate 31B are bonded together by an adhesive layer 31P. A color filter 32 is formed on the other face of the glass substrate 31B. Touch detection electrodes TDL are formed on one face of the glass substrate 31A, and a polarizing plate 35A is arranged on the other face of the glass substrate 31A. By bonding the glass substrates 31B and 31A to the adhesive layer 31P, the touch detection electrodes TDL are interposed between the glass substrates 31B and 31A.

The pixel substrate 2 includes: a TFT substrate 21 as a circuit board; a plurality of pixel electrodes 22 arranged on the TFT substrate 21 in a matrix; a plurality of drive electrodes COML formed between the TFT substrate 21 and the pixel electrodes 22; and an incident-side polarizing plate 35B arranged on the lower face side of the TFT substrate 21.

1-1J. Seventh Modification of First Embodiment

Figure 23:
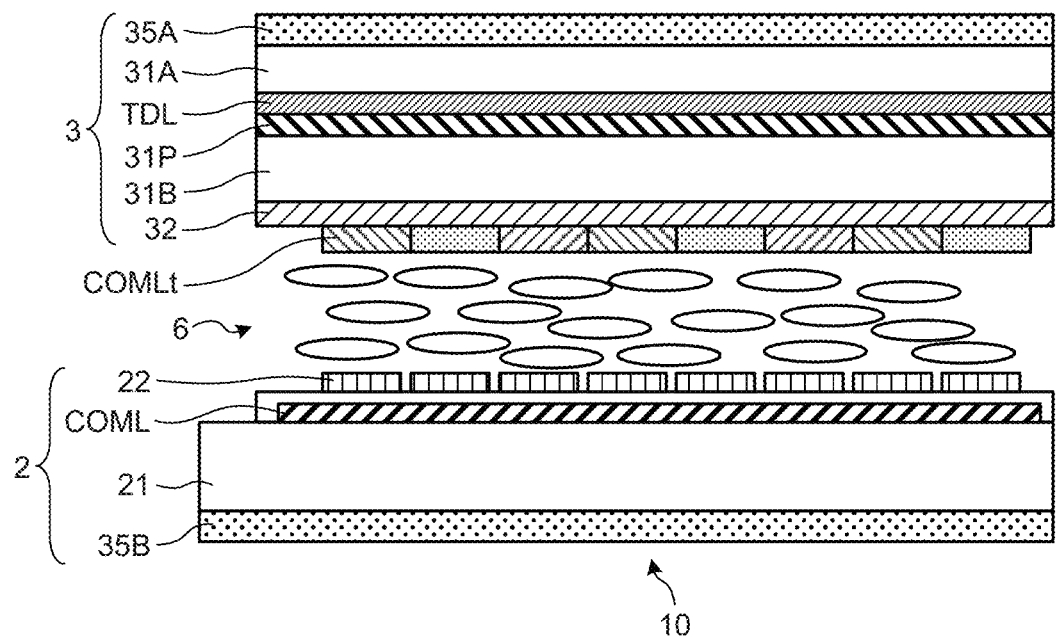
FIG. 23 is a cross-sectional view that illustrates a schematic cross-section structure of a display unit with a touch detection function according to a seventh modification of the first embodiment.

FIG. 23 is a cross-sectional view that illustrates a schematic cross-section structure of a display unit with a touch detection function according to a seventh modification of the first embodiment. In the seventh modification of the first embodiment, the above-described drive electrodes COML serve as common drive electrodes of a liquid crystal display unit 20, and drive electrodes Comt serve as drive electrodes of a touch detection device 30. In other words, a display unit 10 with a touch detection function is a so-called on-cell type device in which the touch detection device 30 of the capacitance type is mounted on the liquid crystal display unit 20 using a liquid crystal display element as a display element. In a display period B in which a display operation is performed, a drive electrode driver 14 applies a drive signal Vcom to the drive electrodes COML as a display drive signal. In a touch detection period A in which a touch detection operation is performed, the drive electrode driver 14 applies a drive signal Vcom to the drive electrodes COMLt as a touch drive signal.

The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. In the counter substrate 3, one face of a glass substrate 31A and one face of a glass substrate 31B are bonded together by an adhesive layer 31P. A color filter 32 is formed on the other face of the glass substrate 31B. A plurality of drive electrodes COMLt are formed on the surface of the color filter 32. Touch detection electrode TDL are formed on one face of the glass substrate 31A, and a polarizing plate 35A is arranged on the other face of the glass substrate 31A. By bonding the glass substrates 31B and 31A to the adhesive layer 31P, the touch detection electrodes TDL are interposed between the glass substrates 31B and 31A.

The pixel substrate 2 includes: a TFT substrate 21 as a circuit board; a plurality of pixel electrodes 22 arranged on the TFT substrate 21 in a matrix; a plurality of drive electrodes COML formed between the TFT substrate 21 and the pixel electrodes 22; and an incident-side polarizing plate 35B arranged on the lower face side of the TFT substrate 21. As described above, in the display unit 10 with a touch detection function according to the seventh modification of the first embodiment, the touch detection device of the capacitance type is mounted on the liquid crystal display unit.

1-2. Second Embodiment

Figure 24:
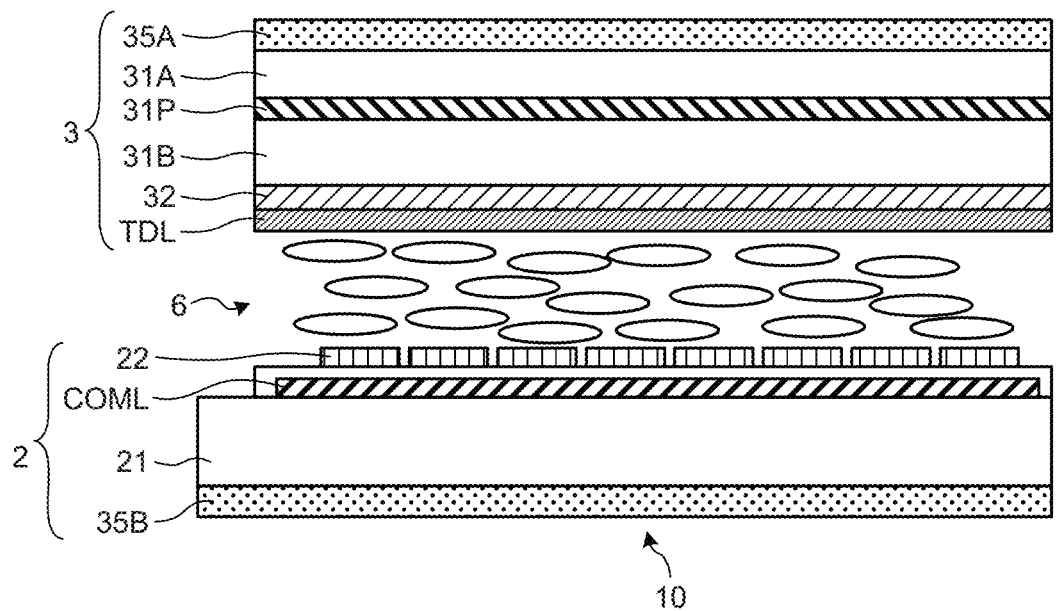
FIG. 24 is a cross-sectional view that illustrates a schematic cross-section structure of a display unit with a touch detection function according to a second embodiment.
Figure 25:
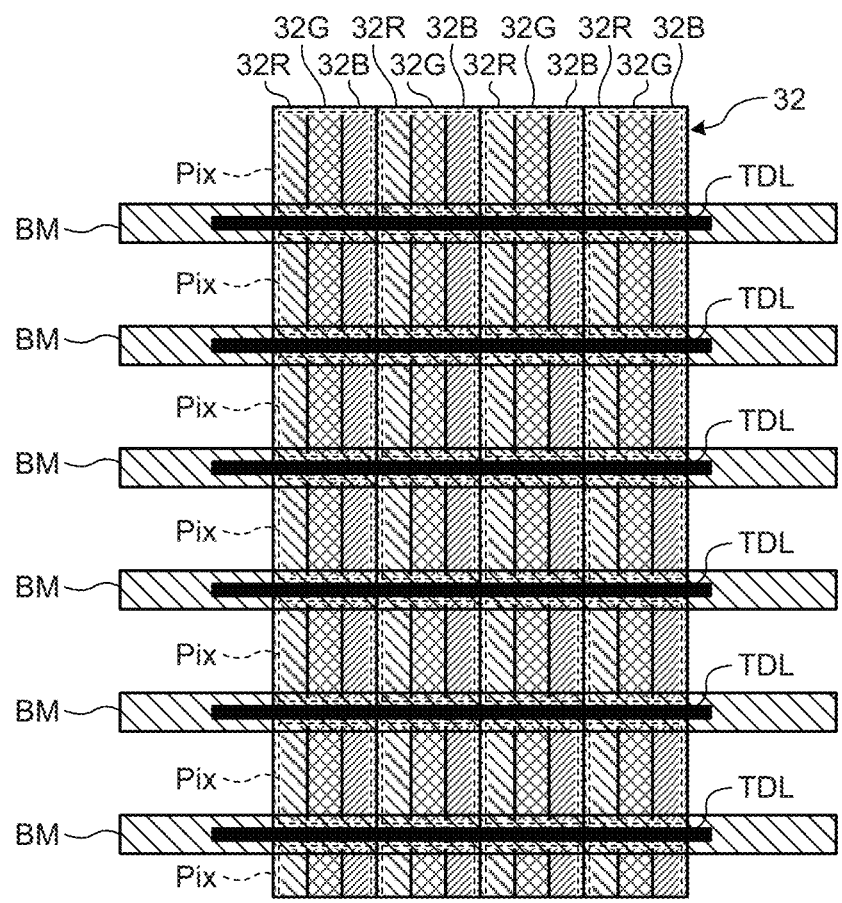
FIG. 25 is a schematic diagram that illustrates the relation between the arrangement of touch detection electrodes and color areas of a color filter according to the second embodiment.

A display device 1 with a touch detection function according to a second embodiment will be described. FIG. 24 is a cross-sectional view that illustrates a schematic cross-section structure of the display unit with a touch detection function according to the second embodiment. FIG. 25 is a schematic diagram that illustrates the relation between the arrangement of touch detection electrodes and color areas of a color filter according to the second embodiment. The same reference numerals are assigned to the same constituent elements as those described in the first embodiment described above, and duplicate description thereof will not be repeated.

The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. In the counter substrate 3, one face of a glass substrate 31A and one face of a glass substrate 31B are bonded together by an adhesive layer 31P. A color filter 32 is formed on the other face of the glass substrate 31B. Touch detection electrodes TDL are formed on the surface of the color filter 32. On the other face of the glass substrate 31A, a polarizing plate 35A is arranged.

The pixel substrate 2 includes: a TFT substrate 21 as a circuit board; a plurality of pixel electrodes 22 arranged on the TFT substrate 21 in a matrix; a plurality of drive electrodes COML formed between the TFT substrate 21 and the pixel electrodes 22; and an incident-side polarizing plate 35B arranged on the lower face side of the TFT substrate 21.

As illustrated in FIG. 24, the touch detection electrodes TDL are arranged at a position nearer to the liquid crystal layer 6 than the color filter 32. As illustrated in FIG. 25, a light shielding layer BM, which has a light shielding action, called as a black matrix that is disposed on the same layer as the layer of the color filter 32 is arranged in an edge portion of the pixel Pix. In a case where the touch detection electrodes TDL are metal wirings extending in a direction different from the extending direction of the pixel signal lines SGL, as illustrated in FIG. 25, the color areas 32R, 32G, and 32B of the color filter 32 and the touch detection electrodes TDL cross over each other. At this time, the touch detection electrodes TDL extend in the extending direction of the light shielding layer BM and is disposed at a position nearer to the pixel electrode 22 than the light shielding layer BM. Accordingly, a decrease in the transmittance that is caused by the touch detection electrode TDL is of the same degree as that of a decrease in the transmittance caused by the light shielding layer BM, and a decrease in the transmittance due to the formation of the touch detection electrodes TDL using a metal material can be reduced.

1-2A. Modification of Second Embodiment

Figure 26:
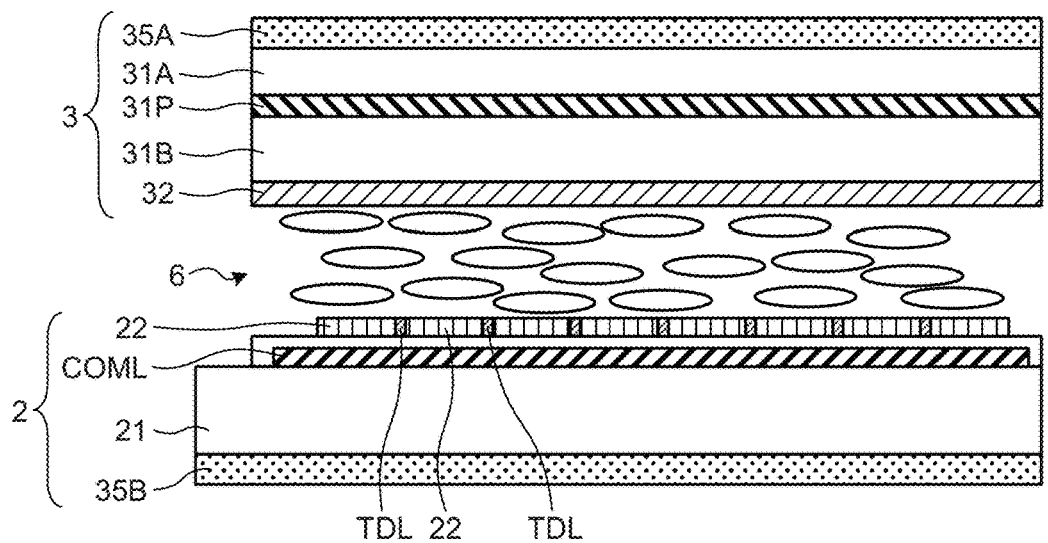
FIG. 26 is a cross-sectional view that illustrates a schematic cross-section structure of a display unit with a touch detection function according to a modification of the second embodiment.

FIG. 26 is a cross-sectional view that illustrates a schematic cross-section structure of a display unit with a touch detection function according to a modification of the second embodiment. The display unit 10 with a touch detection function includes: a pixel substrate 2; a counter substrate 3 that is arranged so as to face the pixel substrate 2 in a direction perpendicular to the surface of the pixel substrate 2; and a liquid crystal layer 6 that is interposed between the pixel substrate 2 and the counter substrate 3. In the counter substrate 3, one face of a glass substrate 31A and one face of a glass substrate 31B are bonded together by an adhesive layer 31P. A color filter 32 is formed on the other face of the glass substrate 31B. On the other face of the glass substrate 31A, a polarizing plate 35A is arranged.

The pixel substrate 2 includes: a TFT substrate 21 as a circuit board; a plurality of pixel electrodes 22 arranged on the TFT substrate 21 in a matrix; touch detection electrodes TDL that are formed in the same layer as that of the pixel electrode 22; a plurality of drive electrodes COML formed between the TFT substrate 21 and the pixel electrode 22; and an incident-side polarizing plate 35B arranged on the lower face side of the TFT substrate 21.

1-2B. Advantage

As above, according to the display device 1 with a touch detection function according to the second embodiment, although the metal touch detection electrodes TDL are used, a decrease in the transmittance or visual recognition of the patterns of the touch detection electrodes TDL due to the metal touch detection electrodes TDL is suppressed. As a result, the touch detection electrodes TDL have low resistance, and the display device 1 with a touch detection function can be formed to be thin, have a large screen, or have high precision.

1-3. Third Embodiment

Figure 27:
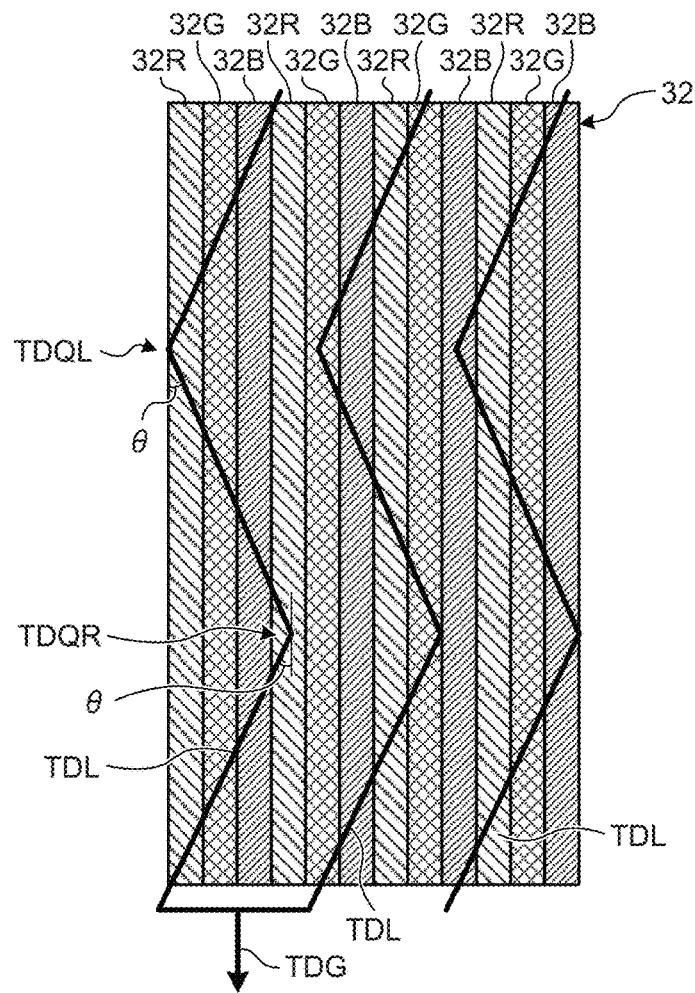
FIG. 27 is a schematic diagram that illustrates the relation between the arrangement of touch detection electrodes and color areas of a color filter according to a third embodiment.

A display device 1 with a touch detection function according to a third embodiment will be described. FIG. 27 is a schematic diagram that illustrates the relation between the arrangement of touch detection electrodes and color areas of a color filter according to the third embodiment. The same reference numerals are assigned to the same constituent elements as those described in the first or second embodiment described above, and duplicate description thereof will not be repeated.

Drive electrodes COML according to the third embodiment face the pixel electrodes 22 in a direction perpendicular to the surface of the TFT substrate 21 and extend in a direction different from the extending direction of the pixel signal lines SGL described above. Accordingly, the touch detection electrodes TDL illustrated in FIG. 27 are metal wirings extending in a direction parallel to a direction in which the pixel signal lines SGL supplying a pixel signal Vpix to each pixel electrode 22 illustrated in FIG. 10 extend, and the metal wirings are arranged with a predetermined pitch. As illustrated in FIG. 27, in a case where the metal wirings of the touch detection electrodes TDL are arranged, bending portions TDQL and TDLOR are regularly included so as not to shield a specific color area of the color filter 32 from light. As illustrated in FIG. 27, the metal wirings of the touch detection electrodes TDL are zigzag wirings in which straight lines having an angle θ with respect to a straight line perpendicular to the above-described scanning signal lines GCL are repeated at the bending portions TDQL and TDLQR at regular intervals. For example, the angle θ is 5 degrees to 75 degrees, is preferably 25 degrees to 40 degrees, and is more preferably 50 degrees to 65 degrees. The metal wirings of the touch detection electrodes TDL may be arranged to have a fluctuation in a desired range. Accordingly, the metal wirings of the touch detection electrodes TDL meander and are wired so as to cross over the color areas 32R, 32G, and 32B of the color filter 32. The extending direction of the touch detection electrodes TDL has an angle with respect to the extending directions of the color areas 32R, 32G, and 32B of the color filter 32. As a result, the metal wires of the touch detection electrodes TDL sequentially shield the color areas 32R, 32G, and 32B of the color filter 32 from light, whereby a decrease in the transmittance in a specific color area of the color filter 32 can be suppressed. A plurality of touch detection electrodes TDL may be configured to be conductive to the detection wiring TDG such that one detection block is used in a plurality of the touch detection electrodes TDL.

1-3A. Modification of Third Embodiment

Figure 28:
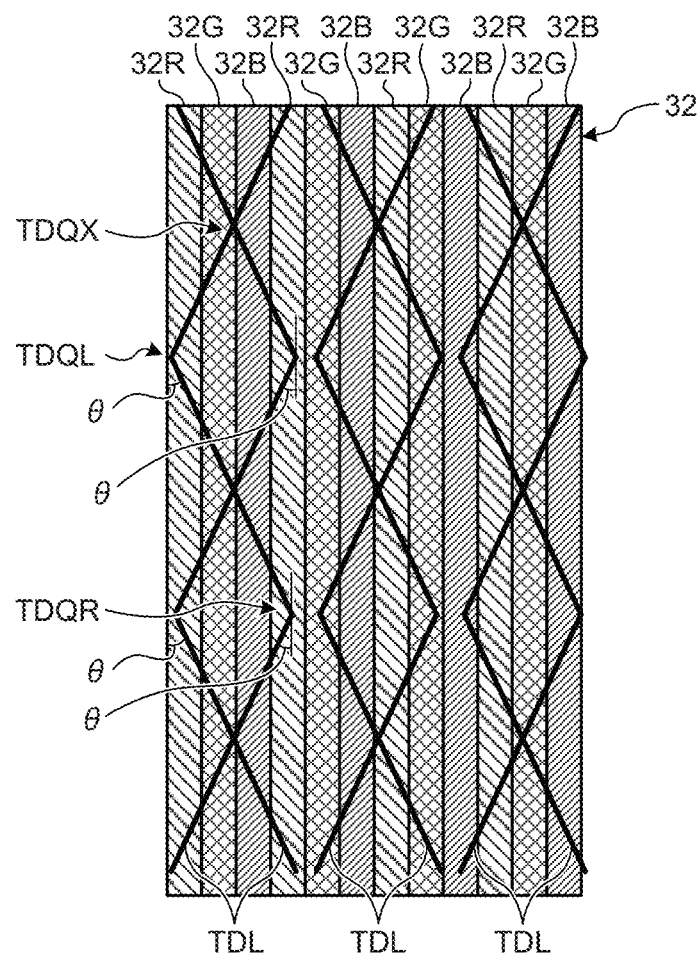
FIG. 28 is a schematic diagram that illustrates the relation between the arrangement of touch detection electrodes and color areas of a color filter according to a modification of the third embodiment.

FIG. 28 is a schematic diagram that illustrates the relation between the arrangement of touch detection electrodes and color areas of a color filter according to a modification of the third embodiment. The touch detection electrodes TDL illustrated in FIG. 28 are metal wirings extending in a direction parallel to a direction in which the pixel signal lines SGL supplying a pixel signal Vpix to each pixel electrode 22 illustrated in FIG. 10 extend, and the metal wirings are arranged with a predetermined pitch. As illustrated in FIG. 28, in a case where the metal wirings of the touch detection electrodes TDL are arranged, bending portions TDQL and TDLOR are regularly included so as not to shield a specific color area of the color filter 32 from light. Accordingly, the metal wirings of the touch detection electrodes TDL intersect each other at intersections TDQX that is disposed on the same plane. The touch detection electrodes TDL that are conductive at the intersection TDQX operate as one detection block. As illustrated in FIG. 28, the metal wirings of the touch detection electrodes TDL are zigzag wirings in which straight lines having an angle θ with respect to a straight line perpendicular to the above-described scanning signal lines GCL are repeated at the bending portions TDQL and TDLQR at regular intervals. For example, the angle θ is 5 degrees to 75 degrees, is preferably 25 degrees to 40 degrees, and is more preferably 50 degrees to 65 degrees. The metal wirings of the touch detection electrodes TDL may be arranged to have a fluctuation in a desired range. The metal wirings of the touch detection electrodes TDL meander and are wired so as to cross over the color areas 32R, 32G, and 32B of the color filter 32. As a result, the metal wirings of the touch detection electrodes TDL sequentially shield the color areas 32R, 32G, and 32B of the color filter 32 from light, whereby a decrease in the transmittance in a specific color area of the color filter 32 can be suppressed.

1-3B. Advantage

As described above, in the display device 1 with a touch detection function according to the third embodiment, although the metal touch detection electrodes TDL are used, a decrease in the transmittance or visual recognition of the patterns of the touch detection electrodes TDL due to the metal touch detection electrodes TDL is suppressed. As a result, the touch detection electrodes TDL have low resistance, and the display device 1 with a touch detection function can be formed to be thin, have a large screen, or have high precision.

1-4. Fourth Embodiment

Figure 29:
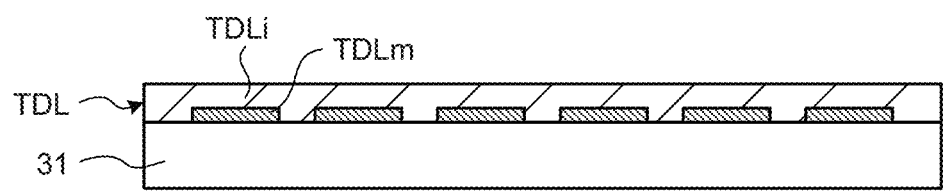
FIG. 29 is a cross-sectional view that illustrates a schematic cross-section structure of touch detection electrodes according to a fourth embodiment.
Figure 30:
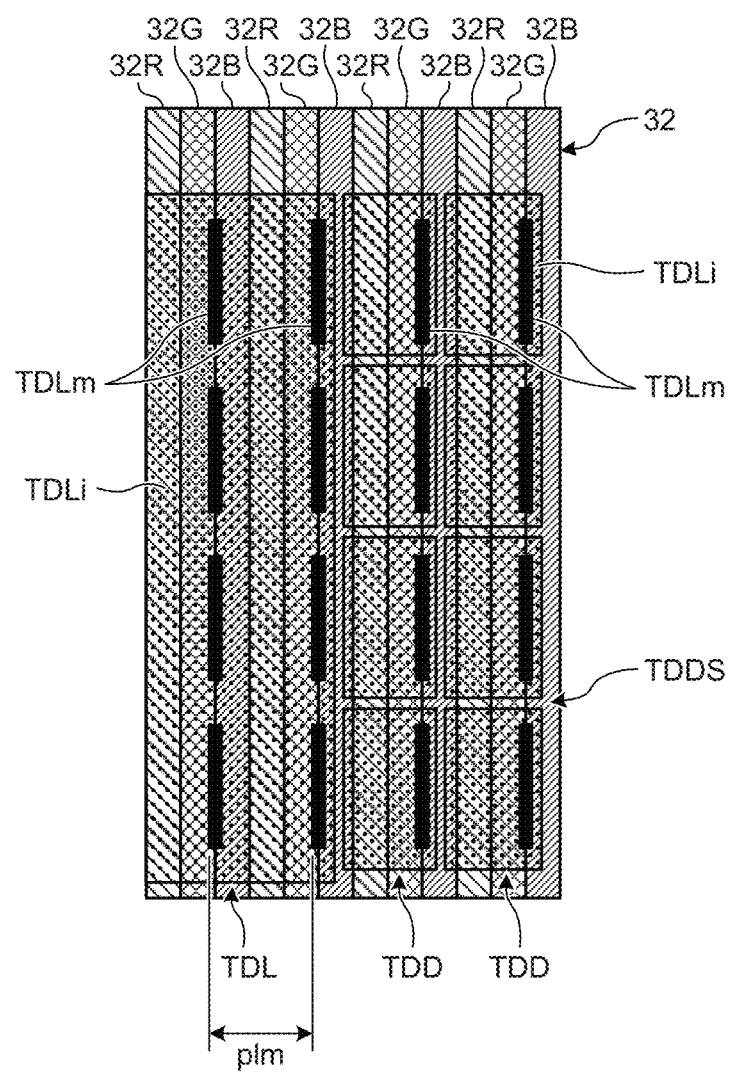
FIG. 30 is a schematic diagram that illustrates the relation between the arrangement of touch detection electrodes and color areas of a color filter according to the fourth embodiment.

A display device 1 with a touch detection function according to a fourth embodiment will be described. FIG. 29 is a cross-sectional view that illustrates a schematic cross-section structure of touch detection electrodes according to the fourth embodiment. FIG. 30 is a schematic diagram that illustrates the relation between the arrangement of touch detection electrodes and color areas of a color filter according to the fourth embodiment. The same reference numerals are assigned to the same constituent elements as those described in the first or second embodiment described above, and duplicate description thereof will not be repeated.

Drive electrodes COML according to the fourth embodiment face pixel electrodes 22 in a direction perpendicular to the surface of a TFT substrate 21 and extend in a direction different from the extending direction of the pixel signal lines SGL described above. Accordingly, as described above, the touch detection electrodes TDL illustrated in FIG. 14 are metal wirings extending in a direction parallel to a direction in which the pixel signal lines SGL supplying a pixel signal Vpix to each pixel electrode 22 illustrated in FIG. 10 extend, and the metal wirings are arranged with a predetermined pitch plm. It is preferable that the predetermined pitch plm between the metal wirings is 10 μm to 500 μm. In a case where the metal wirings of the touch detection electrodes TDL are arranged as illustrated in FIG. 14, as illustrated in FIG. 15, there is a possibility that a specific color area 32B of the color filter 32 is shielded from light. Accordingly, the touch detection electrodes TDL illustrated in FIGS. 29 and 30 are transparent electrodes TDLi, which are formed from ITO or the like, extending in a direction parallel to a direction in which pixel signal lines SGL supplying a pixel signal Vpix to each pixel electrode 22 illustrated in FIG. 10 extend, and the transparent electrodes TDLi are arranged with a predetermined pitch. However, in each of the touch detection electrodes TDL, since the resistance of the transparent electrode TDLi formed of ITO or the like is high, a metal touch electrode (metal electrode) TDLm formed of a metal material of at least one of aluminum (Al), copper (Cu), silver (Ag) and an alloy thereof is stacked on the transparent electrode TDLi. Thus, in the touch detection electrodes TDL, the resistance of only a portion in which the transparent electrode TDLi is present decreases.

In a case where the metal touch electrode TDLm is continuous in the extending direction of the transparent electrode TDLi, there is a possibility that a specific color area 32B of the color filter 32 is shielded from light. Thus, as illustrated in FIG. 30, the metal touch electrode TDLm is configured to be divided in the extending direction of the transparent electrodes TDLi and is electrically conductive to the transparent electrode TDLi. In dummy electrodes TDD, similarly to the touch detection electrode TDL, a metal touch electrode (metal electrode) TDLm is stacked on the transparent electrode TDLi. Thus, the visual recognition due to light shielding of the touch detection electrodes TDL is relieved. The transparent electrodes TDLi are insulated by a gap TDDS.

Figure 31:
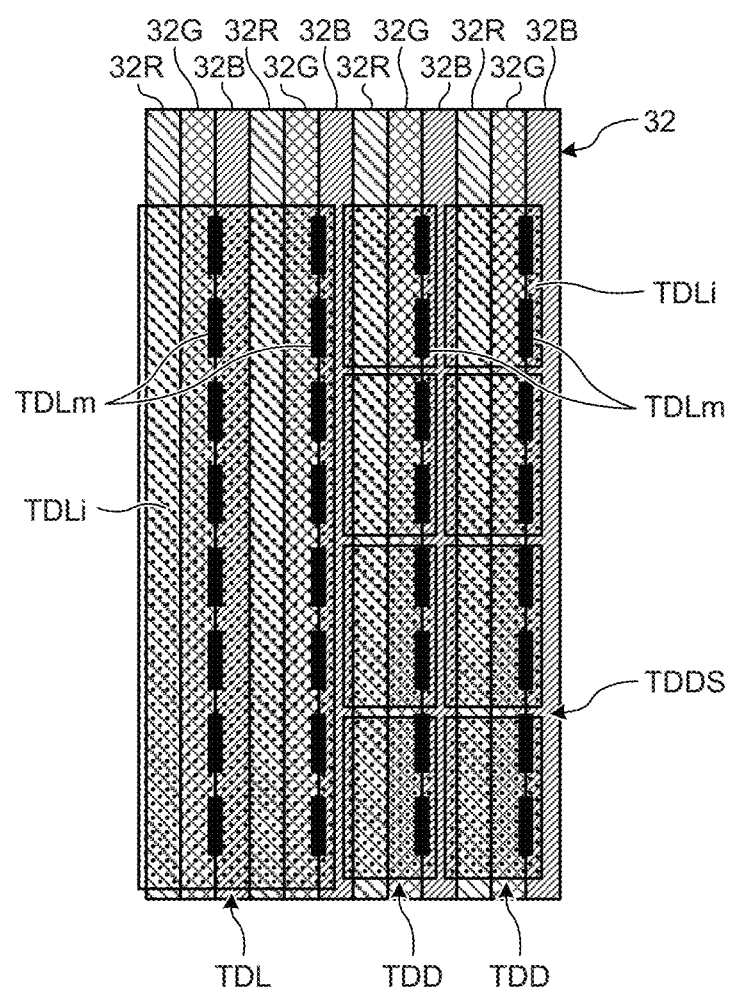
FIG. 31 is a schematic diagram that illustrates the relation between the arrangement of touch detection electrodes and color areas of a color filter according to a first modification of the fourth embodiment.

FIG. 31 is a schematic diagram that illustrates the relation between the arrangement of touch detection electrodes and color areas of a color filter according to a first modification of the fourth embodiment. As the division ratio in the extending direction of the transparent electrode TDLi increases, the metal touch electrode TDLm can suppress a decrease in the transmittance.

Figure 32:
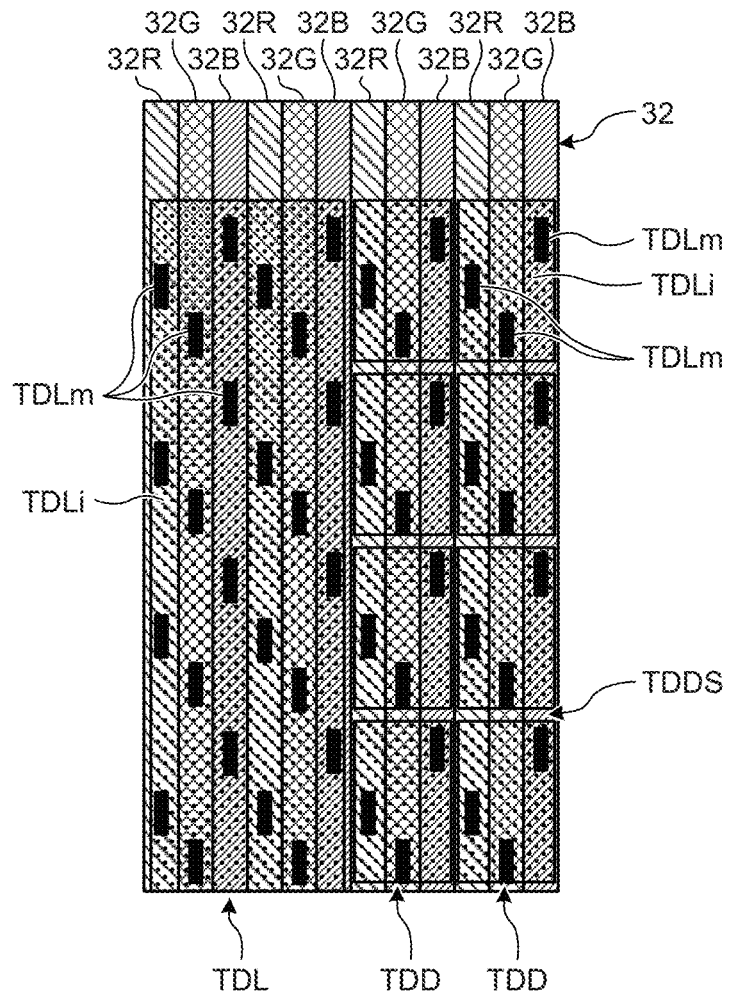
FIG. 32 is a schematic diagram that illustrates the relation between the arrangement of touch detection electrodes and color areas of a color filter according to a second modification of the fourth embodiment.

FIG. 32 is a schematic diagram that illustrates the relation between the arrangement of touch detection electrodes and color areas of a color filter according to a second modification of the fourth embodiment. The metal touch electrodes TDLm are arranged in the color areas 32R, 32G, and 32B of the color filter 32. Thus, a decrease in the transmittance in an area of a specific color in the color filter 32 can be suppressed. By arranging the metal touch electrodes irregularly to some degrees, the display device 1 with a touch detection function can suppress moire.

1-4A. Advantage

As described above, in the display device 1 with a touch detection function according to the fourth embodiment, although the metal touch detection electrodes TDL are used, a decrease in the transmittance or visual recognition of the patterns of the touch detection electrodes TDL due to the metal touch detection electrodes TDL using a metal touch electrode TDLm that uses a metal material is suppressed. As a result, the touch detection electrodes TDL have low resistance, and the display device 1 with a touch detection function can be formed to be thin, have a large screen, or have high precision.

1-5. Other Embodiments and Modifications

As described above, while several embodiments and the modifications thereof have been described, the present disclosure is not limited thereto, and various modifications may be made therein.

In the above-described embodiments, as illustrated in the first embodiment described above, the drive electrode COML is driven to perform scanning for each one drive electrode; however, the present disclosure is not limited thereto. Thus, instead of such scanning, for example, scanning may be performed such that a predetermined number of drive electrodes COML are driven, and the drive electrodes COML are shifted one by.

In the display device 1 with a touch detection function according to each one of the embodiments and the modifications described above, the display unit 10 with a touch detection function may be configured by integrating the liquid crystal display unit 20 using any one of various modes such as TN, VA, and ECB, and the touch detection device 30. Instead of this, the display unit 10 with a touch detection function may be configured by integrating a liquid crystal display unit using a horizontal electric field mode such as fringe field switching (FFS) or in-plane switching (IPS), and the touch detection device.

For example, the display device 1 with a touch detection function may use a liquid crystal of a horizontal electric field mode. In each embodiment described above, a so-called in-cell type is used in which the liquid crystal display unit and the touch detection device of the capacitance type are integrated; however, the present disclosure is not limited thereto. Thus, instead of this, for example, the touch detection device of the capacitance type may be mounted on the liquid crystal display unit. Also in such a case, by employing the above-described configuration, touch detection can be performed while the influence of an external noise or a noise (corresponding to the internal noise in each embodiment described above) propagated from the liquid crystal display unit is suppressed.

2. APPLICATION EXAMPLES

Application examples of the display devices 1 with a touch detection function described in the embodiments and the modifications will be described with reference to FIGS. 33 to 44. FIGS. 33 to 44 are diagrams that illustrate examples of electronic apparatuses to which the display devices with a touch detection function according to the embodiments are applied. The display devices 1 with a touch detection function according to the first, second, third, and fourth embodiments, and modifications thereof may be applied to electronic apparatuses in all the fields such as a television set, a digital camera, a notebook personal computer, a portable terminal device such as a mobile phone, and a video camera. In other words, the display device 1 with a touch detection function according to the first, second, third, and fourth embodiments, and modifications thereof may be applied to electronic apparatuses in all the fields that are used for displaying a video signal input from the outside or a video signal that is internally generated as an image or a video.

Application Example 1

Figure 33:
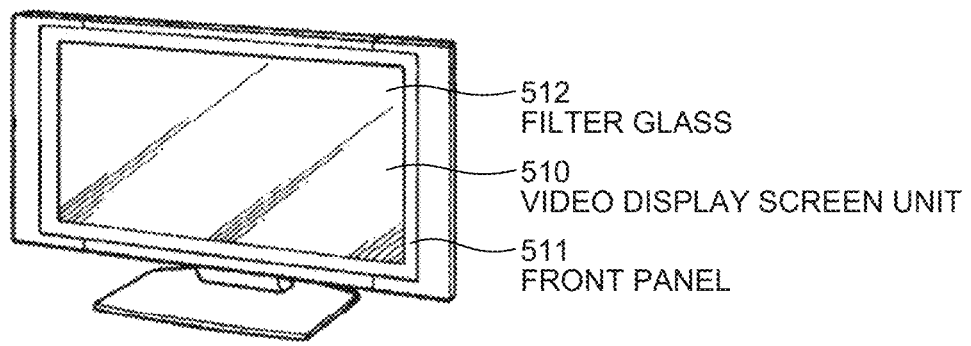
FIG. 33 is a diagram that illustrates an example of an electronic apparatus to which the display device with a touch detection function according to the embodiment is applied.

An electronic apparatus illustrated in FIG. 33 is a television set to which the display devices 1 with a touch detection function according to the first, second, third, and fourth embodiments, and modifications thereof are applied. This television set, for example, includes a video display screen unit 510 that includes a front panel 511 and a filter glass 512, and this video display screen unit 510 corresponds to the display units with a touch detection function according to the first, second, third, and fourth embodiments, and modifications thereof.

Application Example 2

Figure 34:
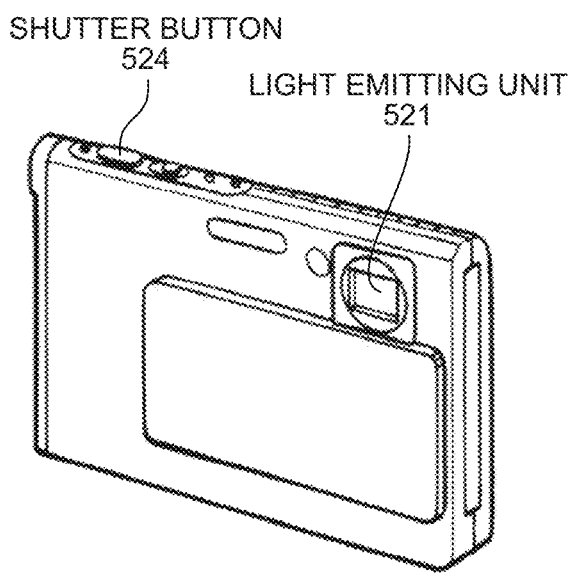
FIG. 34 is a diagram that illustrates another example of an electronic apparatus to which the display device with a touch detection function according to the embodiment is applied.
Figure 35:
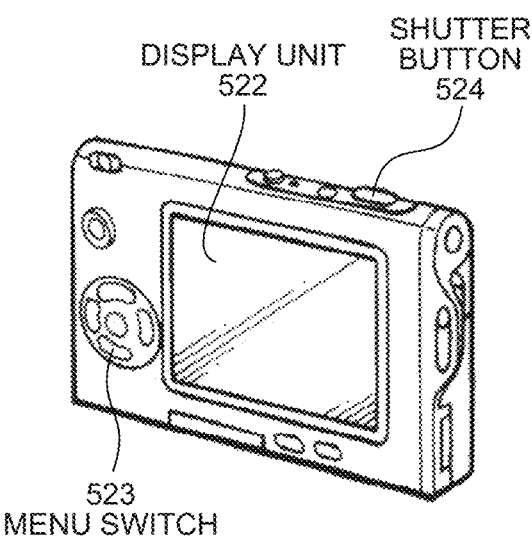
FIG. 35 is a diagram that illustrates another example of an electronic apparatus to which the display device with a touch detection function according to the embodiment is applied.

An electronic apparatus illustrated in FIGS. 34 and 35 is a digital camera to which the display devices 1 with a touch detection function according to the first, second, third, and fourth embodiments, and modifications thereof are applied. This digital camera, for example, includes a light emitting unit 521 for a flash, a display unit 522, a menu switch 523, and a shutter button 524, and the display unit 522 corresponds to the display units with a touch detection function according to the first, second, third, and fourth embodiments, and modifications thereof.

Application Example 3

Figure 36:
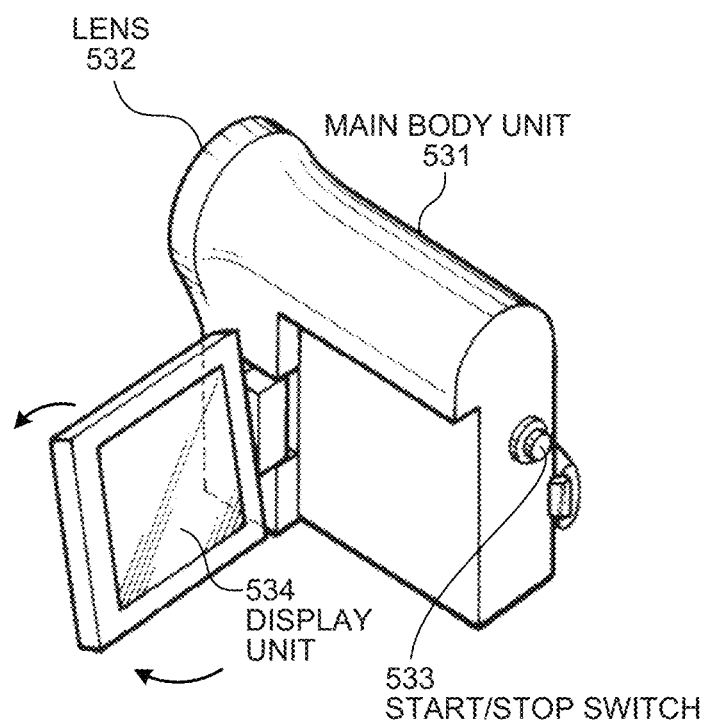
FIG. 36 is a diagram that illustrates another example of an electronic apparatus to which the display device with a touch detection function according to the embodiment is applied.

An electronic apparatus illustrated in FIG. 36 illustrates the external appearance of a video camera to which the display devices 1 with a touch detection function according to the first, second, third, and fourth embodiments, and modifications thereof are applied. This video camera, for example, includes a main body unit 531, a subject photographing lens 532 disposed on a front side face of the main body unit 531, a start/stop switch 533 for photographing, and a display unit 534. The display unit 534 corresponds to the display units with a touch detection function according to the first, second, third, and fourth embodiments, and modifications thereof.

Application Example 4

Figure 37:
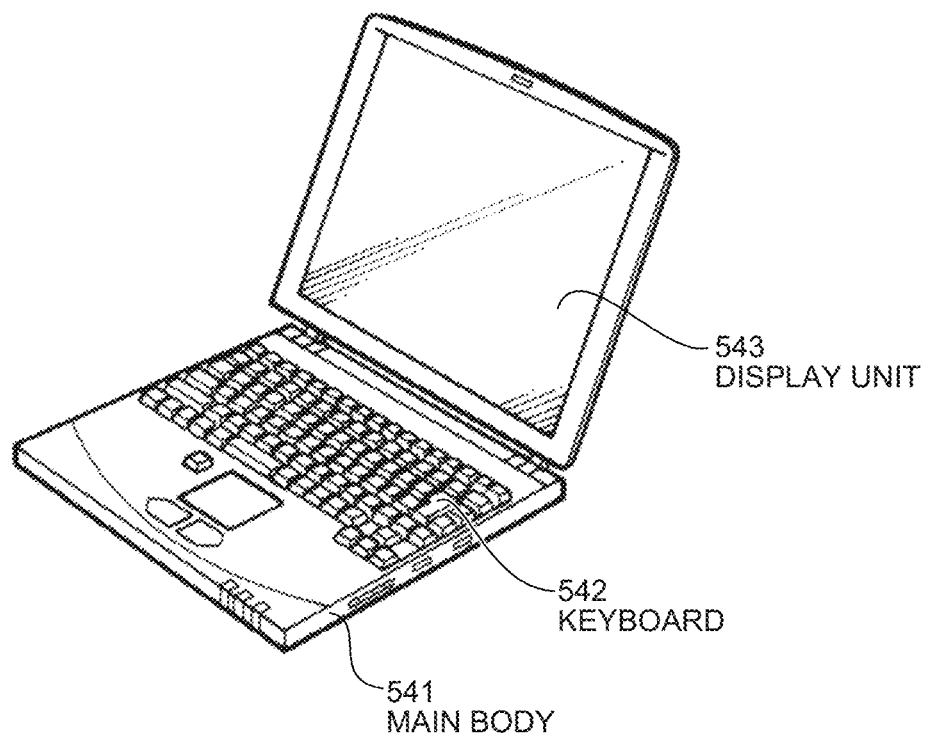
FIG. 37 is a diagram that illustrates another example of an electronic apparatus to which the display device with a touch detection function according to the embodiment is applied.
Figure 38:
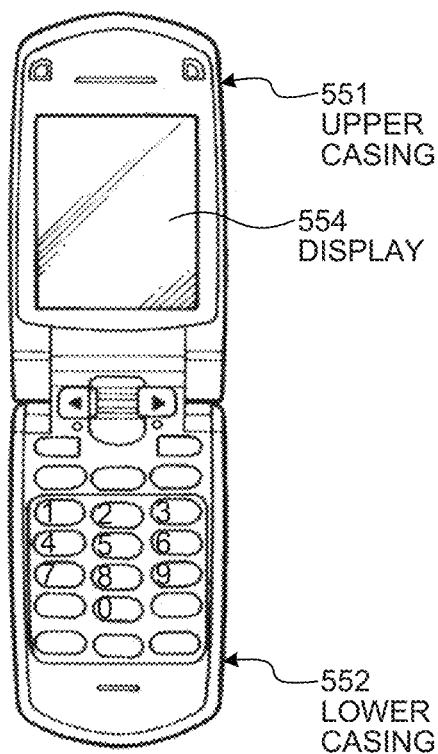
FIG. 38 is a diagram that illustrates another example of an electronic apparatus to which the display device with a touch detection function according to the embodiment is applied.
Figure 39:
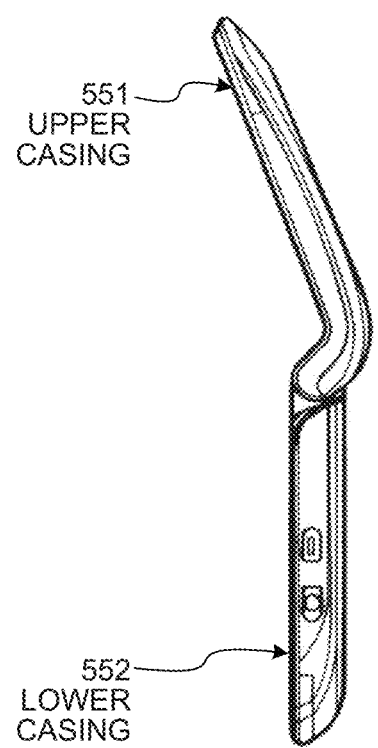
FIG. 39 is a diagram that illustrates another example of an electronic apparatus to which the display device with a touch detection function according to the embodiment is applied.
Figure 40:
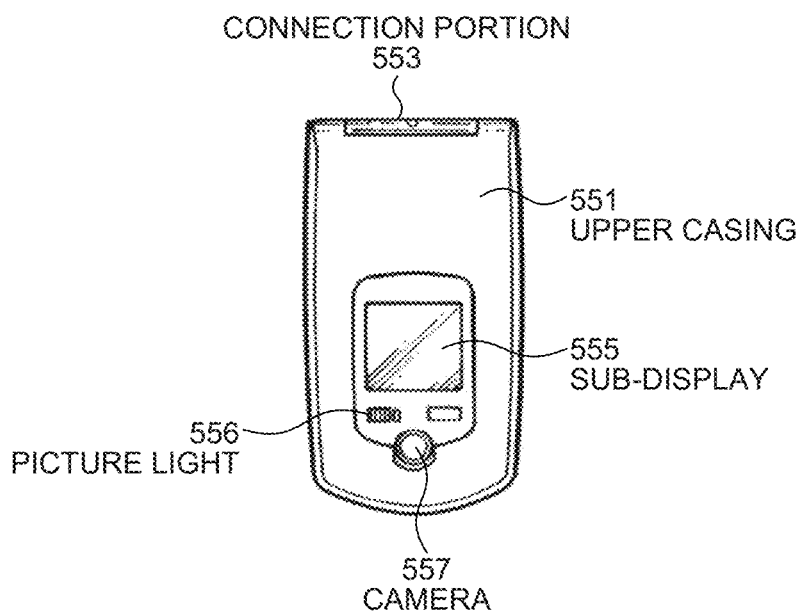
FIG. 40 is a diagram that illustrates another example of an electronic apparatus to which the display device with a touch detection function according to the embodiment is applied.
Figure 41:
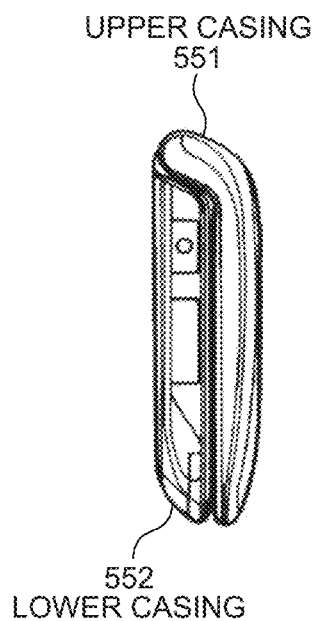
FIG. 41 is a diagram that illustrates another example of an electronic apparatus to which the display device with a touch detection function according to the embodiment is applied.
Figure 42:
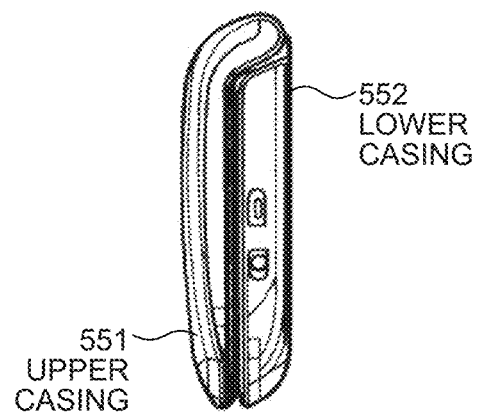
FIG. 42 is a diagram that illustrates another example of an electronic apparatus to which the display device with a touch detection function according to the embodiment is applied.
Figure 43:
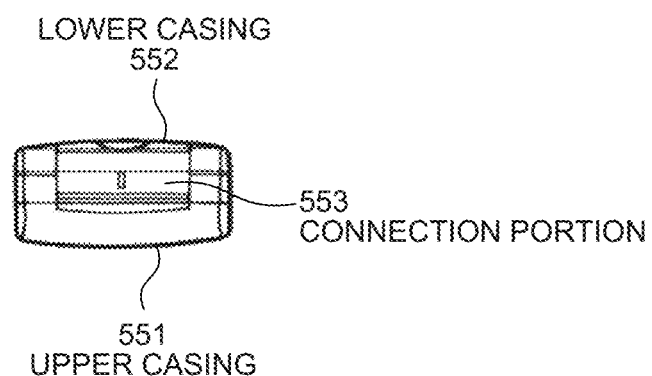
FIG. 43 is a diagram that illustrates another example of an electronic apparatus to which the display device with a touch detection function according to the embodiment is applied.
Figure 44:
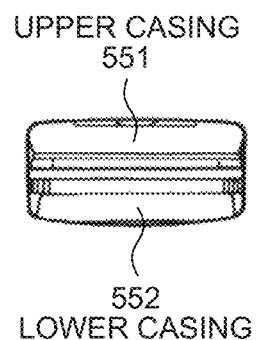
FIG. 44 is a diagram that illustrates another example of an electronic apparatus to which the display device with a touch detection function according to the embodiment is applied.

An electronic apparatus illustrated in FIG. 37 is a notebook personal computer to which the display devices 1 with a touch detection function according to the first, second, third, and fourth embodiments, and modifications thereof are applied. This notebook personal computer, for example, includes a main body 541, a keyboard 542 used for performing an operation of inputting a character or the like, and a display unit 543 displaying an image, and the display unit 543 corresponds to the display units with a touch detection function according to the first, second, third, and fourth embodiments, and modifications thereof.

Application Example 5

An electronic apparatus illustrated in FIGS. 38 to 44 is a mobile phone to which the display devices 1 with a touch detection function according to the first, second, third, and fourth embodiments, and modifications thereof are applied. This mobile phone, for example, is acquired by connecting an upper casing 551 and a lower casing 552 using a connection portion (hinge portion) 553 and includes a display 554, a sub-display 555, a picture light 556, and a camera 557. The display 554 or the sub-display 555 corresponds to the display units with a touch detection function according to the first, second, third, and fourth embodiments, and modifications thereof.

3. Aspects of Present Disclosure

The present disclosure includes the following aspects.
(1) A display device with a touch detection function comprising:
  a substrate;
  a plurality of pixel electrodes that are arranged in a matrix on a plane parallel to a surface of the substrate;
  a plurality of signal lines that extend on a plane parallel to the surface of the substrate and supply pixel signals used for displaying an image to the pixel electrodes;
  a display functional layer that performs an image displaying function based on the pixel signals;
  a drive electrode that faces the plurality of the pixel electrodes in a vertical direction with respect to the surface of the substrate and extends in a direction parallel to an extending direction of the signal lines; and
  a plurality of touch detection electrodes that are metal wirings facing the drive electrode in the vertical direction and extending in a direction different from the extending direction of the signal lines, the metal wirings being arranged with a predetermined pitch so as to make capacitive coupling with the drive electrode.
(2) The display device with a touch detection function according to (1), further comprising a color filter that faces the display functional layer in the vertical direction and has a plurality of color areas including at least one of a color area colored in red, a color area colored in green, and a color area colored in blue,
  wherein an extending direction of each color area of the color filter coincides with the extending direction of the signal lines, and
  the plurality of touch detection electrodes cross over each color area of the color filter.

(3) The display device with a touch detection function according to (1), wherein the metal wirings are arranged at intervals of a natural number multiple of a pitch of pixels of the display functional layer.

(4) The display device with a touch detection function according to (3), wherein the touch detection electrodes are disposed in a layer nearer to the pixel display functional layer than a light shielding layer shielding light in an edge portion of the pixels.

(5) The display device with a touch detection function according to claim 1, wherein the touch detection electrodes include a bending portion.

(6) A display device with a touch detection function comprising:
  a substrate;
  a plurality of pixel electrodes that are arranged in a matrix on a plane parallel to a surface of the substrate;
  a plurality of signal lines that extend on a plane parallel to the surface of the substrate and supply pixel signals to the pixel electrodes;
  a display functional layer that performs an image displaying function based on the pixel signals;
  a drive electrode that faces the plurality of the pixel electrodes in a vertical direction with respect to the surface of the substrate and extends in a direction different from an extending direction of the signal lines;
  a plurality of touch detection electrodes that are metal wirings facing the drive electrode in the vertical direction, the metal wirings being arranged with a predetermined pitch so as to make capacitive coupling with the drive electrode; and
  a color filter that faces the display functional layer in the vertical direction and has a plurality of color areas including at least one of a color area colored in red, a color area colored in green, and a color area colored in blue,
  wherein the plurality of touch detection electrodes cross over each color area of the color filter while extending in an extending direction of the signal lines.

(7) The display device with a touch detection function according to claim 6, wherein the touch detection electrodes include a bending portion such that an extending direction of the touch detection electrodes has an angle with respect to the extending direction of each color area of the color filter.

(8) A display device with a touch detection function comprising:
  a substrate;
  a plurality of pixel electrodes that are arranged in a matrix on a plane parallel to a surface of the substrate;
  a plurality of signal lines that extend on a plane parallel to the surface of the substrate and supply pixel signals to the pixel electrodes;
  a display functional layer that performs an image displaying function based on the pixel signals;
  a drive electrode that faces the plurality of the pixel electrodes in a vertical direction with respect to the surface of the substrate and extends in a direction different from an extending direction of the signal lines;
  a plurality of touch detection electrodes that face the drive electrode in the vertical direction and are arranged with a predetermined pitch so as to make capacitive coupling with the drive electrode; and
  a color filter that faces the display functional layer in the vertical direction and has a plurality of color areas including at least one of a color area colored in red, a color area colored in green, and a color area colored in blue,
  wherein the plurality of touch detection electrodes include
    (a) a transparent electrode extending along a specific one of the color areas of the color filter and
    (b) a metal electrode that is divided in the extending direction and is stacked on the transparent electrode.

(9) The display device with a touch detection function according to claim 1, wherein the touch detection electrode is configured to detect an external proximity object by using a change in electrostatic capacitance that is caused by proximity or contact of the external proximity object.

(10) The display device with a touch detection function according to claim 1, further comprising a scanning drive unit that applies a display drive signal to the drive electrode in a display operation period and applies a touch drive signal to the drive electrode in a touch detection operation period.

(11) An electronic apparatus including a display device with a touch detection function capable of detecting an external proximity object, the display device with a touch detection function comprising:
  a substrate;
  a plurality of pixel electrodes that are arranged in a matrix on a plane parallel to a surface of the substrate;
  a plurality of signal lines that extend on a plane parallel to the surface of the substrate and supply pixel signals used for displaying an image to the pixel electrodes;
  a display functional layer that performs an image displaying function based on the pixel signals;
  a drive electrode that faces the plurality of the pixel electrodes in a vertical direction with respect to the surface of the substrate and extends in a direction parallel to an extending direction of the signal lines; and
  a plurality of touch detection electrodes that are metal wirings facing the drive electrode in the vertical direction and extending in a direction different from the extending direction of the signal lines, the metal wirings being arranged with a predetermined pitch so as to make capacitive coupling with the drive electrode.

(12) An electronic apparatus including a display device with a touch detection function capable of detecting an external proximity object, the display device with a touch detection function comprising:
  a substrate;
  a plurality of pixel electrodes that are arranged in a matrix on a plane parallel to a surface of the substrate;
  a plurality of signal lines that extend on a plane parallel to the surface of the substrate and supply pixel signals to the pixel electrodes;
  a display functional layer that performs an image displaying function based on the pixel signals;
  a drive electrode that faces the plurality of the pixel electrodes in a vertical direction with respect to the surface of the substrate and extends in a direction different from an extending direction of the signal lines;
  a plurality of touch detection electrodes that are metal wirings facing the drive electrode in the vertical direction, the metal wirings being arranged with a predetermined pitch so as to make capacitive coupling with the drive electrode; and a color filter that faces the display functional layer in the vertical direction and has a plurality of color areas including at least one of a color area colored in red, a color area colored in green, and a color area colored in blue, and wherein the plurality of touch detection electrodes cross over each color area of the color filter while extending in an extending direction of the signal lines.

(13) An electronic apparatus including a display device with a touch detection function capable of detecting an external proximity object, the display device with a touch detection function comprising:

a substrate;

a plurality of pixel electrodes that are arranged in a matrix on a plane parallel to a surface of the substrate;

a plurality of signal lines that extend on a plane parallel to the surface of the substrate and supply pixel signals to the pixel electrodes;

a display functional layer that performs an image displaying function based on the pixel signals;

a drive electrode that faces the plurality of the pixel electrodes in a vertical direction with respect to the surface of the substrate and extends in a direction different from an extending direction of the signal lines;

a plurality of touch detection electrodes that face the drive electrode in the vertical direction and are arranged with a predetermined pitch so as to make capacitive coupling with the drive electrode; and a color filter that faces the display functional layer in the vertical direction and has a plurality of color areas including at least one of a color area colored in red, a color area colored in green, and a color area colored in blue, and wherein the plurality of touch detection electrodes include
(a) a transparent electrode extending along a specific one of the color areas of the color filter and
(b) a metal electrode that is divided in the extending direction and is stacked on the transparent electrode.

Examples of the electronic apparatus of the present disclosure include, but are not limited to, television sets, digital cameras, personal computers, video cameras, and portable devices such as cellular phone and smart phones.

According to one aspect of the present disclosure, while metal touch detection electrodes are used, a decrease in transmittance or the visual recognition of the patterns of the touch detection electrodes due to the metal touch detection electrodes is suppressed.

According to one aspect of the present disclosure, the resistance of the touch detection electrodes decreases, and the display device with a touch detection function can be formed to be thin, have a large screen, or have high precision.

What is claimed is:

1. A display device with a touch detection device, comprising
   scan lines each extending overall in a first direction;
   signal lines each extending overall in a second direction crossing the first direction;
   display elements;
   thin film transistors each connected to a corresponding one of the display elements, the thin film transistors each being surrounded by the scan lines and the signal lines; and
   touch detection electrodes including a first thin metal wire, a second thin metal wire, a third thin metal wire, and a fourth thin metal wire that are opposed to the display elements,
   wherein
   the first thin metal wire, the second thin metal wire, the third thin metal wire, and the fourth thin metal wire each are straight line,
   the first thin metal wire and the fourth thin metal wire each extend in a third direction different from the first and second directions,
   the second thin metal wire and the third thin metal wire each extend in a fourth direction different from the first, second, and third directions,
   the first thin metal wire intersects the third thin metal wire,
   the second thin metal wire intersects the fourth thin metal wire,
   the first thin metal wire is connected to the second thin metal wire at a first connection point,
   the third thin metal wire is connected to the fourth thin metal wire at a second connection point, and
   the first thin metal wire, the second thin metal wire, the third thin metal wire, and the fourth thin metal wire each intersect the scan lines.

2. The display device with a touch detection device according to claim 1,
   wherein the touch detection electrodes are arranged in a same layer.

3. The display device with a touch detection device according to claim 1,
   wherein a pitch of the display elements is less than each of a first length of the first thin metal wire, a second length of the second thin metal wire, a third length of the third thin metal wire, and the fourth length of the fourth thin metal wire.

4. The display device with a touch detection device according to claim 1,
   wherein the touch detection electrodes are coupled to a touch detection circuit to detect an external approaching object.

5. The display device with a touch detection device according to claim 1,
   wherein the touch detection electrodes extend overall in the second direction.

6. The display device with a touch detection device according to claim 1,
   wherein the first thin metal wire, the second thin metal wire, the third thin metal wire, and the fourth thin metal wire are disposed on a same layer.

7. The display device with a touch detection device according to claim 1,
   wherein the first connection point and the second connection point are aligned along the first direction.

* * * * *